United States Patent
Shah et al.

(10) Patent No.: US 12,536,123 B2
(45) Date of Patent: *Jan. 27, 2026

(54) RECONFIGURABLE DATAFLOW UNIT HAVING REMOTE FIFO MANAGEMENT FUNCTIONALITY

(71) Applicant: SambaNova Systems, Inc., Palo Alto, CA (US)

(72) Inventors: Manish K. Shah, Austin, TX (US); Ram Sivaramakrishnan, San Jose, CA (US); Gregory Frederick Grohoski, Bee Cave, TX (US); Raghu Prabhakar, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/383,745

(22) Filed: Oct. 25, 2023

(65) Prior Publication Data

US 2024/0070106 A1    Feb. 29, 2024

Related U.S. Application Data

(63) Continuation-in-part of application No. 18/218,562, filed on Jul. 5, 2023, now Pat. No. 12,271,333.
(Continued)

(51) Int. Cl.
 *G06F 13/42*    (2006.01)
(52) U.S. Cl.
 CPC ................... *G06F 13/42* (2013.01)
(58) Field of Classification Search
 CPC ....................................................... G06F 13/42
 See application file for complete search history.

(56) References Cited

U.S. PATENT DOCUMENTS

| 8,321,618 B1 | 11/2012 | Keil et al. |
| 10,594,499 B1 * | 3/2020 | Deshpande ............ H04W 76/00 |

(Continued)

FOREIGN PATENT DOCUMENTS

| EP | 1877927 B1 | 3/2011 |
| WO | 2010142987 A1 | 12/2010 |

OTHER PUBLICATIONS

U.S. Appl. No. 63/349,733, filed Jun. 7, 2022, Manish K. Shah.
(Continued)

*Primary Examiner* — Henry Tsai
*Assistant Examiner* — John B Roche
(74) *Attorney, Agent, or Firm* — Flagship Patents; Bruce A. Young; Sikander M. Khan

(57) ABSTRACT

A reconfigurable processing unit includes a first and second internal network, an interface to an external network, a first configurable unit coupled to the first internal network, a second configurable unit coupled to both internal networks, and a third configurable unit coupled to both the second internal network and the interface to the external network. The third configurable unit is configured to receive a payload containing a transaction type identifier and an identifier of the second configurable unit through the interface to the external network, and send a first packet including the transaction type identifier to the second configurable unit over the second internal network. The second configurable unit is configured to increment a counter in response to a particular transaction type identifier, and send a token to the first configurable unit over the first internal network while the counter is non-zero and the first configurable unit is executing.

10 Claims, 7 Drawing Sheets

Related U.S. Application Data

(60) Provisional application No. 63/405,240, filed on Sep. 9, 2022, provisional application No. 63/390,484, filed on Jul. 19, 2022, provisional application No. 63/389,767, filed on Jul. 15, 2022.

(56) References Cited

U.S. PATENT DOCUMENTS

| | | | |
|---|---|---|---|
| 10,698,853 | B1 | 6/2020 | Grohoski et al. |
| 10,886,921 | B1 | 1/2021 | Koganti et al. |
| 10,908,914 | B2 | 2/2021 | Vorbach et al. |
| 11,055,141 | B2 | 7/2021 | Prabhakar et al. |
| 11,615,038 | B2 | 3/2023 | Tørudbakken et al. |
| 2005/0257012 | A1 | 11/2005 | Hughes |
| 2009/0300262 | A1 | 12/2009 | Vorbach |
| 2010/0191911 | A1 | 7/2010 | Heddes et al. |
| 2010/0293304 | A1 | 11/2010 | Alexandron et al. |
| 2015/0227490 | A1 | 8/2015 | Seo et al. |
| 2016/0055120 | A1 | 2/2016 | Vorbach et al. |
| 2016/0188469 | A1 | 6/2016 | Nagarajan et al. |
| 2017/0026350 | A1* | 1/2017 | Dawoud ............... H04L 63/067 |
| 2018/0089132 | A1 | 3/2018 | Atta et al. |
| 2019/0158396 | A1 | 5/2019 | Yu et al. |
| 2020/0183437 | A1* | 6/2020 | Eng ........................ G05F 1/70 |
| 2022/0171716 | A1 | 6/2022 | Benisty et al. |
| 2023/0070690 | A1 | 3/2023 | Mugu et al. |
| 2023/0244748 | A1 | 8/2023 | Natarja et al. |
| 2023/0251839 | A1 | 8/2023 | Shah et al. |
| 2023/0251993 | A1 | 8/2023 | Shah et al. |
| 2024/0020261 | A1 | 1/2024 | Jordan et al. |

OTHER PUBLICATIONS

CA 3125707—First Office Action, dated Jan. 21, 2022, 3 pages.
CA 3125707—Voluntary Amendments, dated Jan. 4, 2022, 8 pages.
EP 20702339.8—Response to Rules 161(1) and 162 Communication, filed Feb. 25, 2022, 10 pages.
EP 20702939.8—Rules 161(1) and 162 Communication, dated Aug. 18, 2021, 3 pages.
Koeplinger et al., Spatial: A Language and Compiler for Application Accelerators, PLDI '18, Jun. 18-22, 2018, Association for Computng Machinery, 16 pages.
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
PCT/US2020/012079—International Preliminary Report on Patentability, dated May 7, 2021, 14 pages.
PCT/US2020/012079—International Search Report and Written Opinion mailed Apr. 29, 2020, 18 pages.
PCT/US2020/012079—Second Article 34 Amendment {Response to Informal Communication by Telephone) dated 02 rebruary 2021, as filed on Apr. 2, 2021, 5 pages.
PCT/US2023/012723—International Search Report and Written Opinion, dated May 31, 2023, 13 pages.
Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.
TW 108148376—Notice of Allowance dated Oct. 23, 2020, 5 pages.
TW 108148376—Request for Exam and Voluntary Amendment filed Jun. 30, 2020, 17 pages.
TW 110101760—First Office Action dated Mar. 29, 2022, 12 pages.
TW110101760—Notice of Allowance, dated Sep. 21, 2022, 2 pages.
U.S. Appl. No. 16/239,252—Notice of Allowance dated Feb. 12, 2020, 10 pages.
U.S. Appl. No. 16/239,252—Notice of Allowance dated May 14, 2020, 15 pages.
U.S. Appl. No. 16/239,252—Office Action dated Aug. 7, 2019, 8 pages.
U.S. Appl. No. 16/239,252—Response to Final Office Action dated Jan. 8, 2020 filed Jan. 24, 2020, 14 pages.
U.S. Appl. No. 16/239,252—Response to Office Action dated Aug. 7, 2019, filed Sep. 26, 2019, 6 pages.
U.S. Appl. No. 16/239,252 Final Office Action, dated Jan. 8, 2020, 13 pages.
U.S. Appl. No. 16/862,445—Notice of Allowance, dated Sep. 17, 2021, 15 pages.
U.S. Appl. No. 16/862,445—Response to Office Action dated Mar. 18, 2021, filed Jun. 9, 2021, 12 pages.
Yan Ming, Yang Ziyu, Li Sikun, "A Reconfigurable Soc for Block Ciphers with a Programmable Dataflow Structure," 2011 ThirdInternational Conference on Communications and Mobile Computing (Year: 2011) 4 pages.
U.S. Appl. No. 18/107,613—Non-Final Rejection dated May 13, 2024, 8 pages.
U.S. Appl. No. 18/107,690—Notice of Allowance, dated Mar. 6, 2024, 9 pages.
U.S. Appl. No. 18/199,361—Non-Final Rejection dated Dec. 21, 2023, 12 pages.
U.S. Appl. No. 18/199,361—Non-Final Rejection dated Jul. 3, 2024, 17 pages.
Ming et al., A Reconfigurable Soc for Block Ciphers with a Programmable Dataflow Structure, dated Apr. 18-20, 2011, Third International Conference on Communications and Mobile Computing, 4 pages.
Prabhakar et al., SambaNova SN10 RDU: A 7nm Dataflow Architecture to Accelerate Software 2.0, dated Feb. 20-26, 2022, IEEE International Solid-State Circuits Conference, 3 pages.
U.S. Appl. No. 18/383,718—Notice of Allowance, dated Jul. 15, 2024, 12 pages.

* cited by examiner

Stream Write to PMU

SCTS

Remote Write

Remote Read Request/Completion

Barrier – RSync / RSync Completion

RECONFIGURABLE DATAFLOW UNIT HAVING REMOTE FIFO MANAGEMENT FUNCTIONALITY

CROSS-REFERENCE

This application is a continuation-in-part of U.S. patent application Ser. No. 18/218,562, entitled "Peer-To-Peer Route Through In A Reconfigurable Computing System," filed on Jul. 5, 2023, which claims the benefit of U.S. Provisional Patent Application No. 63/390,484, entitled "Peer-To-Peer Route Through In A Reconfigurable Computing System," filed on Jul. 19, 2022, U.S. Provisional Patent Application No. 63/405,240, entitled "Peer-To-Peer Route Through In A Reconfigurable Computing System," filed on Sep. 9, 2022, and U.S. Provisional Application 63/389,767, entitled "Peer-to-Peer Communication between Reconfigurable Dataflow Units," filed on Jul. 15, 2022.

This application is related to the following patent applications, which are hereby incorporated by reference for all purposes:

- U.S. patent application Ser. No. 16/239,252, now U.S. Pat. No. 10,698,853, entitled "Virtualization of a Reconfigurable Data Processor," filed Jan. 3, 2019;
- U.S. provisional patent application No. 63/349,733, entitled "Head Of Line Blocking Mitigation In A Reconfigurable Data Processor," filed on Jun. 6, 2022;
- U.S. patent application Ser. No. 18/107,613, entitled "Head Of Line Blocking Mitigation In A Reconfigurable Data Processor," filed on Feb. 9, 2023;
- U.S. patent application Ser. No. 18/107,690, entitled "Two-Level Arbitration in a Reconfigurable Processor," filed on Feb. 9, 2023;
- U.S. patent application Ser. No. 18/383,718, entitled "Peer-To-Peer Communication Between Reconfigurable Dataflow Units," filed Oct. 25, 2023;
- U.S. patent application Ser. No. 18/383,742, entitled "Reconfigurable Dataflow Unit With Remote Read/Write Functionality," filed Oct. 25, 2023; and
- U.S. patent application Ser. No. 18/383,744, entitled "Reconfigurable Dataflow Unit With Streaming Write Functionality," filed Oct. 25, 2023.

The following publications are incorporated by reference for all purposes:

Prabhakar et al., "Plasticine: A Reconfigurable Architecture for Parallel Patterns," *ISCA '17*, Jun. 24-28, 2017, Toronto, ON, Canada; and Koeplinger et al., "Spatial: A Language and Compiler for Application Accelerators," *Proceedings of the 39th ACM SIGPLAN Conference on Programming Language Design and Implementation* (PLDI), Proceedings of the 43rd International Symposium on Computer Architecture, 2018.

BACKGROUND

The present subject matter relates to communication between integrated circuits, more specifically to inter-die communication between elements that respectively communicate on their own intra-die network.

Reconfigurable processors, including field programmable gate arrays (FPGAs), can be configured to implement a variety of functions more efficiently or faster than might be achieved using a general purpose processor executing a computer program. So called Coarse-Grained Reconfigurable Architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

In a system having multiple Reconfigurable Dataflow Units (RDUs), the nodes of a computational graph can be split across multiple RDU sockets. The communication between RDU peers (i.e. peer-to-peer, or P2P, communication) is achieved using transactions which are implemented as a layer on the top of the transaction layer packet (TLP) of PCIe by encapsulating P2P protocol messages in the TLP payload. Units on the internal intra-die networks in the RDU include specific functionality to support for P2P transactions.

Various P2P transactions may be supported by technology described herein. These transactions include primitive protocol messages, and complex transactions consisting of one or more primitive protocol messages. The following list may be interpreted as providing examples for various implementations and some implementations may support a subset of the messages and transactions listed and some implementations may support messages and transactions not listed below using similar mechanisms to those disclosed herein.

Primitive P2P Protocol Messages:
Remote Read Request
Remote Write Request
Remote Read Completion
Stream Write
Stream CTS
RSync Barrier
Complex P2P Transactions composed from one or more protocol messages:
Remote Write—Scatter or Store
Remote Read—Load or Gather
Stream Write to a Remote PMU
Stream Write to Remote DRAM
Host Write
Host Read
Barrier Reference now is made in detail to the examples illustrated in the accompanying drawings and discussed below.

Figure 1:
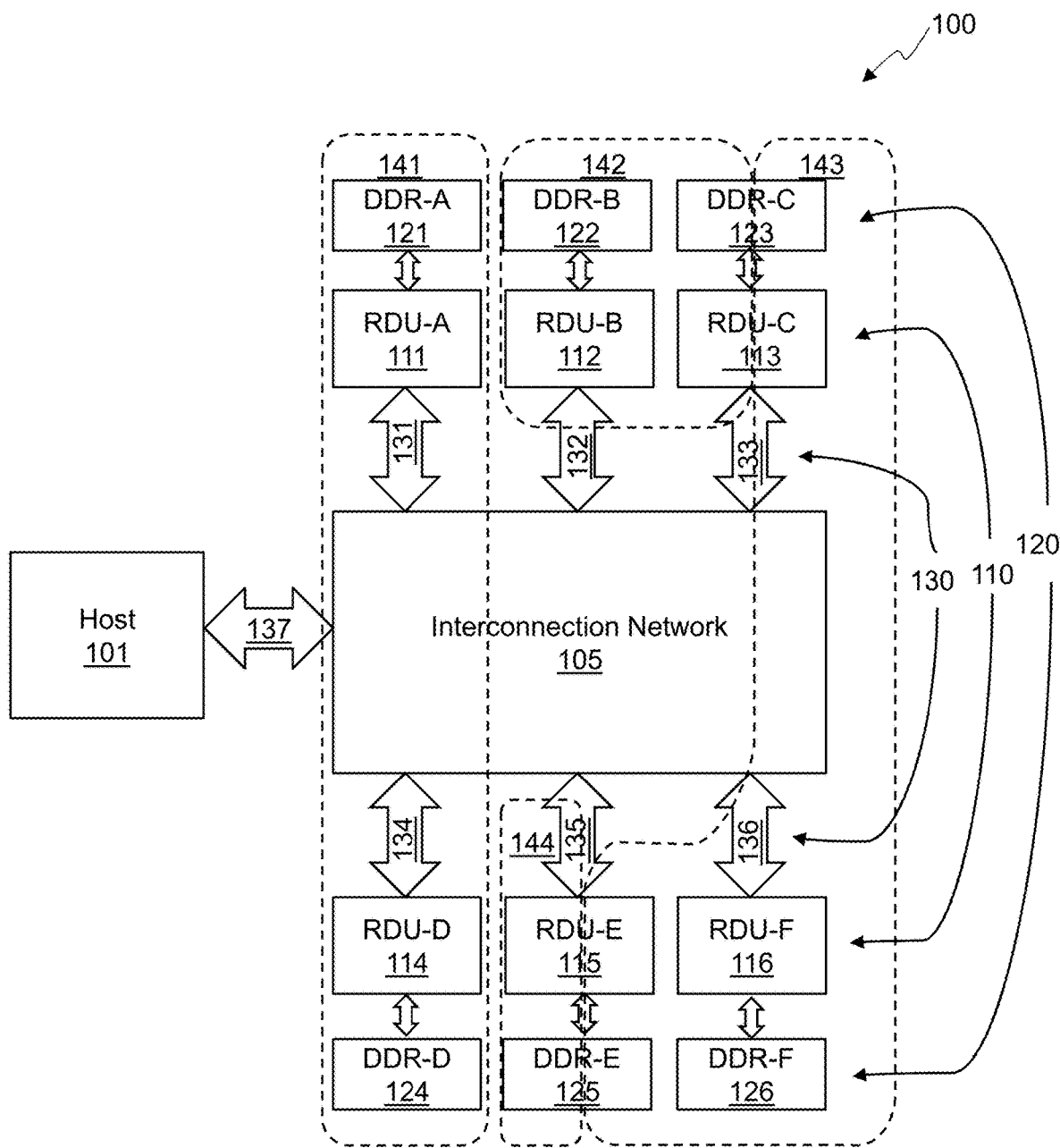
FIG. 1 is a block diagram depicting one example of a reconfigurable computing system wherein various embodiments disclosed herein may be deployed.

FIG. 1 is a block diagram depicting one example of a reconfigurable computing system 100 wherein various embodiments disclosed herein may be deployed. As depicted, the reconfigurable computing system 100 includes a host computer 101, a number of reconfigurable dataflow units (RDUs) 110 (111-116), an interconnection network 105 and communication links 130 (131-137) that connect the host 101 and the RDUs 110 to the interconnection network 105. The environment 100 may also include memory 120 respectively coupled to the RDUs 110. The memory 120 can be any type of memory, including dynamic data rate (DDR) dynamic random access memory (DRAM), including DDR-A 121 coupled to RDU-A 111, including DDR-B 122 coupled to RDU-B 112, including DDR-C 123 coupled to RDU-C 113, including DDR-D 124 coupled to RDU-D 114, including DDR-E 125 coupled to RDU-E 115, and including DDR-F 126 coupled to RDU-F 116.

The communication links 130 can be any type of communication link, parallel or serial, electrical or optical, but in some implementations may each be one or more physical Peripheral Component Interconnect Express (PCIe) links of one or more lanes. The PCIe links may be compliant with any version of the PCIe specification. The interconnection network 120 may have any type of topology depending on the system design and particular embodiment. In some implementations the interconnection network 120 may be implemented as direct links between pairs of devices where each device is an RDUs 111-116 or host 101. So for example the host may have 6 individual links that respectively directly connect to the 6 RDUs 111-116 and each RDU may, in addition to its link connecting to the host 101, may have a link to each of the other RDUs 111-116. In that implementation, RDU-A 111 has a first link connecting directly to the host 101, a second link connecting directly to RDU-B 122, a third link connecting directly to RDU-C 123, a fourth link connecting directly to RDU-D 124, a fifth link connecting directly to RDU-E 125, and a sixth link connecting directly to RDU-F 126; so link 131 may include 6 individual links. In other embodiments, the interconnection network 120 may include a bus structure or a switching fabric that is able to route a transaction from an originating RDU 110 or host 101 to a destination RDU 110 or host 101.

Each of the RDUs 110 may include a grid of compute units and memory units interconnected with an internal switching array fabric such as those detailed elsewhere in this specification. The RDUs 110 can be configured by downloading configuration files from the host 101 to configure the RDUs 110 to execute one or more graphs 141-144 that define dataflow computations, and can implement any type of functionality including, but not limited to neural networks. The communication links 130 and the interconnect network 101 provide a high degree of connectivity can increase the dataflow bandwidth between the RDUs 110 and enable the RDUs 110 to cooperatively process large volumes of data via the dataflow operations specified in the execution graphs 141-144.

A set of graphs 141-144 can be assigned to the system 100 for execution. The graphs 141-144 are overlaid on the block diagram of the system 100 showing how they may be assigned to the RDUs 110. In the example shown, graph1 141 is assigned to RDU-A 111 and RDU-D 114, graph2 142 is assigned to RDU-B 112 and sections of RDU-C 113, graph3 143 is assigned to sections of RDU-C 113, RDU-F 116, and sections of RDU-E 115, while graph 4 144 is assigned to sections of RDU-E 115. While the set of graphs 141-144 is statically depicted, one of skill in the art will appreciate that the executions graphs are likely not synchronous (i.e., of the same duration) and that the partitioning within a reconfigurable computing environment will likely be dynamic as execution graphs are completed and replaced.

As can be understood from FIG. 1, nodes of a graph may be distributed across multiple RDUs. Nodes of a graph within an RDU may communicate using internal communication paths of the RDU, but communication between nodes of a single graph in different RDUs may use P2P communication over the links 130 and interconnection network 105.

FIG. 1 shows example graph1 141 spread across multiple RDUs with RDU-A 111 configured to execute a first node of the graph1 141, and another RDU-D 114 configured to execute a second node of the same graph1 141. The first node of graph1 141 may send data to the second node of graph1 141. In some systems, a connected host processor 101 may be used to move the data from the first node to the second node. The functionality described herein allows RDU-A 111 to send the data from the first node directly to RDU-D 114 without passing through the host 101.

As mentioned above, the host 101 may configure the RDUs 110 by downloading configuration bit files to the RDUs 110. This may be accomplished by sending the configuration bit files over the communication links 130 and interconnection network 105. The configuration bit files can include information to configure individual units within the RDUs 110 (which are described in more detail below) as well as the internal communication paths between those units. The configuration bit files may be static for the duration of execution of a graph and configure a portion of an RDU 111-116 (or the entire RDU) to execute one or more nodes of an execution graph 141-144.

Figure 2:
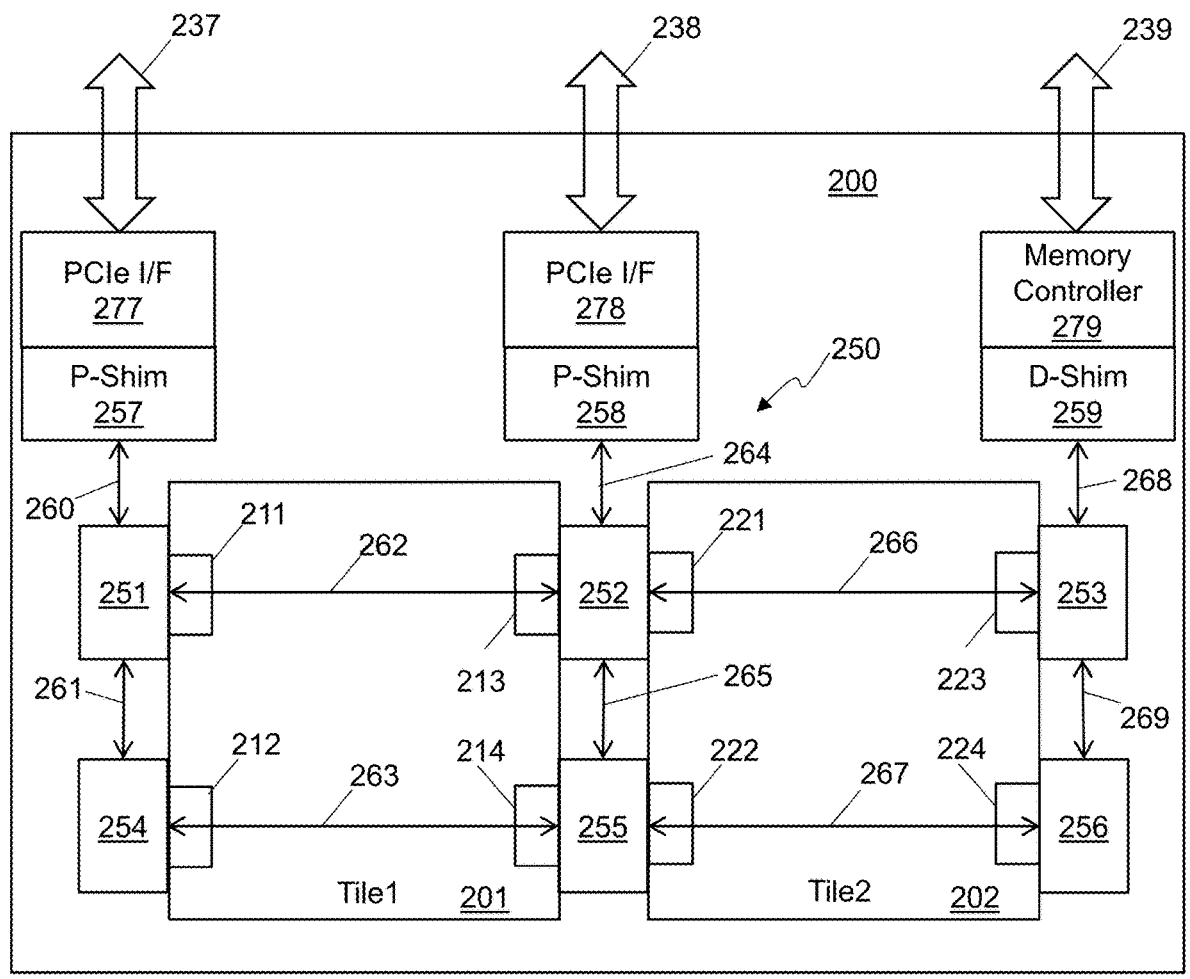
FIG. 2 is a simplified block diagram of an example Reconfigurable Dataflow Unit (RDU) having a CGRA (Coarse-Grained Reconfigurable Architecture).

FIG. 2 is a simplified block diagram of an example RDU 200 having a CGRA (Coarse Grain Reconfigurable Architecture) which may be used as an RDU 111-116 in the system 100 of FIG. 1. In this example, the RDU 200 has 2 tiles (Tile1 201, Tile2 202), although other implementations can have any number of tiles, including a single tile. A tile 201, 202 (which is shown in more detail in FIG. 3A) comprises an array of configurable units connected by an array-level network in this example. Each of the two tiles 201, 202 has one or more AGCUs (Address Generation and Coalescing Units) 211-214, 221-224. The AGCUs are nodes on both a top level network 250 and on array-level networks within their respective tiles 201, 202 and include resources for routing data among nodes on the top level network 250 and nodes on the array-level network in each tile 201, 202.

The tiles 201, 202 are coupled a top level network (TLN) 250 that includes switches 251-256 and links 260-269 that allow for communication between elements of Tile1 201, elements of Tile2 202, and shims to other functions of the RDU 200 including P-Shims 257, 258 and M-Shim 259. Other functions of the RDU 200 may connect to the TLN 250 in different implementations, such as additional shims to additional and or different input/output (I/O) interfaces and memory controllers, and other chip logic such as CSRs, configuration controllers, or other functions. Data travel in packets between the devices (including switches 251-256) on the links 260-269 of the TLN 250. For example, top level switches 251 and 252 are connected by a link 262, top level switches 251 and P-Shim 257 are connected by a link 260, top level switches 251 and 254 are connected by a link 261, and top level switch 253 and D-Shim 259 are connected by a link 268.

The TLN 250 is a packet-switched mesh network with four independent networks operating in parallel; a request network, a data network, a response network, and a credit network. While FIG. 2 shows a specific set of switches and links, various implementations may have different numbers and arrangements of switches and links. All 4 networks (request, data, response, and credit) follow the same protocol. The only difference between the four networks is the size and format of their payload packets. A TLN transaction consists of 4 parts, a valid signal, a header, a packet, and a credit signal. To initiate a transaction, a TLN agent (the driver) can assert the valid signal and drive the header on the link connected to a receiver. The header consists of the node ID of the source and destination. Note that source and destination refer to the endpoints of the overall transaction, not the ID of an intermediate agent such as a switch. In the following cycle, the agent will drive the packet. The credit signal is driven by the receiver back to the driver when it has dequeued the transaction from its internal queues. TLN agents have input queues to buffer incoming transactions. Hop credits are assigned to drivers based on the sizes of those queues. A driver cannot initiate a transaction (i.e. assert the valid signal) unless it has credits available.

There are two types of credits used to manage traffic on the TLN 250. The first, as mentioned above, are hop credits. These are credits used to manage the flow of transactions between adjacent points on the network. The other type of credits are referred to as end-to-end credits. In order to prevent persistent backpressure on the TLN 250, communication on the TLN 250 is controlled by end-to-end credits. The end-to-end credits create a contract between a transaction source and an endpoint to which it sends the transaction. An exception to this if a destination that processes inbound traffic immediately with no dependencies. In that case the number of end-to-end credits can be considered infinite and no explicit credits are required. The number of end-to-end credits is generally determined by the size of input queues in the destination units. Agents will generally have to perform both a hop credit check to the connected switch and an end-to-end credit check to the final destination. The transaction can only take place if a credit is available to both. Note that the TLN components (e.g. switches) do not directly participate in or have any knowledge of end to end credits. These are agreements between the connected agents and not a function of the network itself.

As was previously mentioned, the TLN 250 is a packet-switched mesh network using an array of switches for communication between agents. Any routing strategy can be used on the TLN 250, depending on the implementation, but some implementations may arrange the various components of the TLN 250 in a grid and use a row, column addressing scheme for the various components. Such implementations may then route a packet first vertically to the designated row, and then horizontally to the designated destination. Other implementations may use other network topologies and/or routing strategies for the TLN 250.

P-Shims 257, 258 provide an interface between the TLN 250 and PCIe Interfaces 277, 278 which connect to external communication links 237, 238 which may form part of communication links 130 as shown in FIG. 1. While two P-Shims 257, 258 with PCIe interfaces 277, 278 and associated PCIe links 237, 238 are shown, implementations can have any number of P-Shims and associated PCIe interfaces and links. A D-Shim 259 provides an interface to a memory controller 279 which has a DDR interface 239 and can connect to memory such as the memory 120 of FIG. 1. While only one D-Shim 259 is shown, implementations can have any number of D-Shims and associated memory controllers and memory interfaces. Different implementations may include memory controllers for other types of memory, such as a flash memory controller and/or a high-bandwidth memory (HBM) controller. The interfaces 257-259 include resources for routing data among nodes on the top level network (TLN) 250 and external devices, such as high-capacity memory, host processors, other CGRA processors, FPGA devices and so on, that are connected to the interfaces 257-259.

As explained earlier, in the system shown in FIG. 1 each RDU can include an array of configurable units is disposed in a configurable interconnect (array level network), and the configuration file defines a data flow graph including functions in the configurable units and links between the functions in the configurable interconnect. In this manner the configurable units act as sources or sinks of data used by other configurable units providing functional nodes of the graph. Such systems can use external data processing resources not implemented using the configurable array and interconnect, including memory and a processor executing a runtime program, as sources or sinks of data used in the graph.

Furthermore, such systems may include communication resources which can be arranged in a mesh-like network known as a top level network (TLN) 250. The communication resources may facilitate communication between the configurable interconnect of the array (array level network) and the external data processing resources (memory and host). In one embodiment, the tiles tile0 and tile1 in the RDU 200 (which represents a configuration of RDUs A-G) are connected to the host 101 via the top-level network (TLN) 250 including links 260-269 shown in FIG. 2.

More details about the TLN and the on-chip arrangement of the RDU 200, the ALN, and the TLN and communication among those are described in a related U.S. provisional patent application 63/349,733 which is incorporated by reference as if fully set forth herein.

Figure 3A:
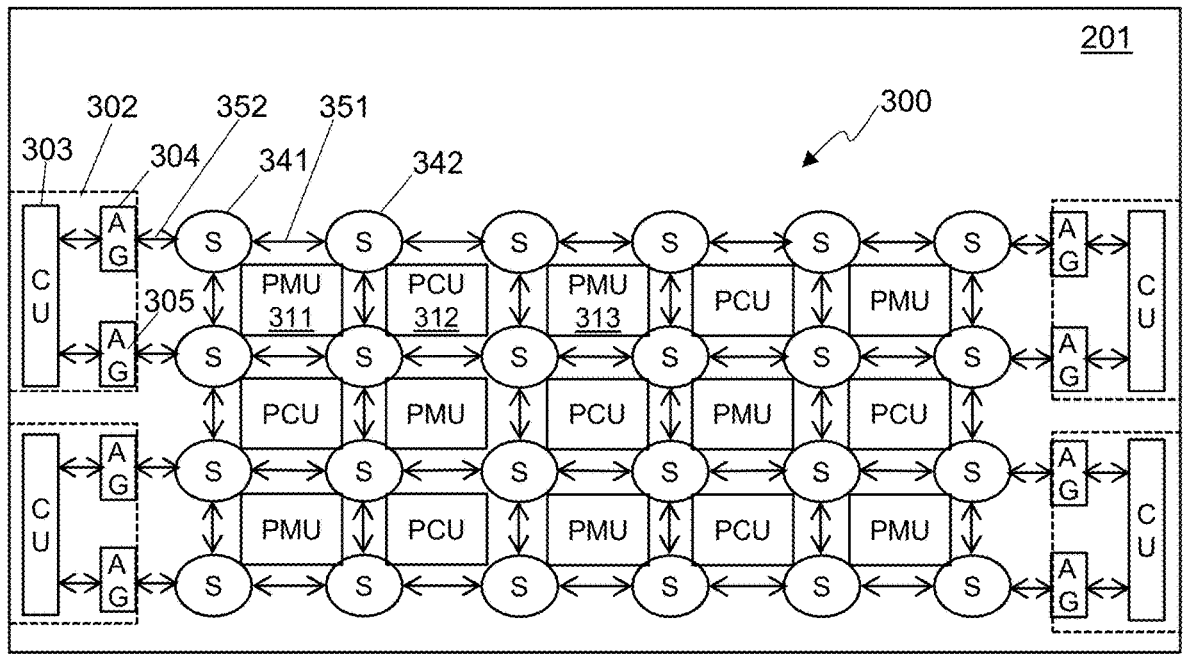
FIG. 3A is a simplified diagram of an example tile of an RDU.

FIG. 3A is a simplified diagram of tile 201 (which may be identical to tile 202) of FIG. 2, where the configurable units in the array 300 are nodes on the array-level network. In this example, the array of configurable units 300 includes a plurality of types of configurable units. The types of configurable units in this example include Pattern Compute Units (PCU) such as PCU 312, Pattern Memory Units (PMU) such as PMUs 311, 313, switch units (S) such as Switches 341, 342, and Address Generation and Coalescing Units (AGCU) such as AGCU 302. An AGCU can include one or more address generators (AG) such as AG 304 and a shared coalescing unit (CU) such as CU 303. For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein.

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units by a configuration load/unload controller in an AGCU based on the contents of the bit file to allow all the components to execute a program (i.e., a graph). Program Load may also load data into a PMU memory.

The array-level network includes links interconnecting configurable units in the array. The links in the array-level network include one or more and, in this case three, kinds of physical buses: a chunk-level vector bus (e.g. 128 bits of data), a word-level scalar bus (e.g. 32 bits of data), and a multiple bit-level control bus. For instance, interconnect 351 between switch 341 and 342 and interconnect 352 between switch 341 and AG 304, each include a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include (as non-limiting examples):

A bit to indicate if the chunk is scratchpad memory or configuration store data.
Bits that form a chunk number.
Bits that indicate a column identifier.
Bits that indicate a row identifier.
Bits that indicate a component identifier.

The array-level network may route the data of the vector bus and/or scalar bus using two-dimension order routing using either a horizontal first or vertical first routing strategy. The vector bus and/or scalar bus may allow for other types of routing strategies, including using routing tables in switches to provide a more flexible routing strategy in some implementations.

Figure 3B:
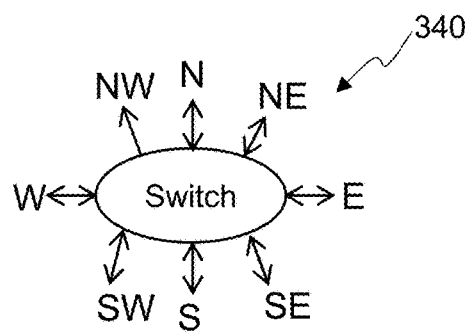
FIG. 3B illustrates an example switch unit for connecting elements in an array-level network.

FIG. 3B illustrates an example switch unit 340 connecting elements in an array-level network such as switches 341, 342 of the array 300 in FIG. 3A. As shown in the example of FIG. 3B, a switch unit can have 8 interfaces. The North, South, East, and West interfaces of a switch unit are used for connections between switch units. The Northeast, Southeast, Northwest, and Southwest interfaces of a switch unit are each used to make connections to PCU or PMU instances. At least some switch units at the edges of the tile have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array-level network.

The configurable units can access off-chip memory through D-Shim 259 and memory controller 279 (see FIG. 2) by routing a request through an AGCU. An AGCU contains a reconfigurable scalar datapath to generate requests for the off-chip memory. The AGCU contains FIFOs (first-in-first-out buffers for organizing data) to buffer outgoing commands, data, and incoming responses from the off-chip memory.

The address generators (AGs) in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

An AGCU has a set of virtual address generators (VAGs) that can be programmed to communicate with a particular configurable unit in the array 300, such as a PMU 311. Each VAG can also be programmed to generate a particular address pattern and includes several other features which are described later in this disclosure. In at least one implementation, each AGCU includes 16 VAGs. In some implementations, the address generation units (e.g. AG 304) may each be a VAG.

As shown in FIG. 1, there are cases where a configurable unit on one RDU may want to send or receive data controlled by another RDU. The peer-to-peer (P2P) protocol provides several primitives that can be used to accomplish this, including a remote write, a remote read request, a remote read completion, a stream write, a stream clear-to-send (SCTS), and/or an RSync Barrier which is a special primitive that is not encapsulated in a P2P header. The P2P primitives can be used to create more complex transactions that utilize one or more P2P primitive operations. The complex transactions may include a remote store, a remote scatter write, a remote read, a remote gather read, a stream write to a remote PMU, a stream write to remote DRAM, a host write, a host read, and/or a barrier operation.

A configurable unit in a tile works in its own address space (which may simply be a stream of ordered data in some cases), so to communicate with a resource outside of the tile which may utilize its own physical address space, one or more levels of address translation may be used to convert the address space of the configurable unit to the address space of the other resource. Much of this address translation may be performed by the Virtual Address Generator (VAG) in an Address Generation and Coalescing Unit (AGCU) 211-214, 221-224 in FIG. 2 or the AGCU 302 in FIG. 3A.

Figure 3C:
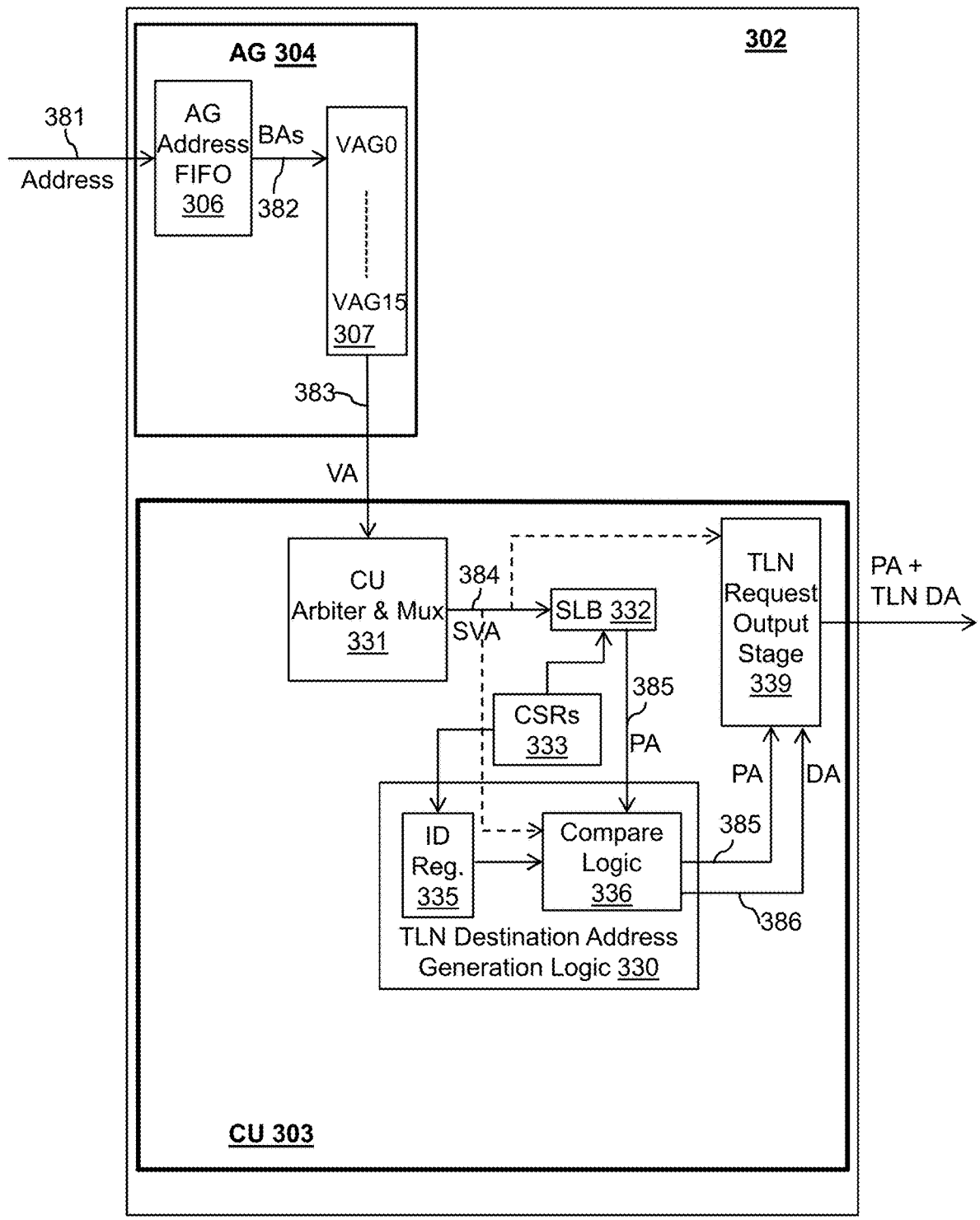
FIG. 3C is a block diagram showing more detail of an example Address Generation and Coalescing Unit (AGCU).

FIG. 3C is a block diagram showing more detail of AGCU 302. The block diagram may also be representative of one of the AGCUs 211-214, 221-224 in FIG. 2 or the other AGCUs in FIG. 3A. As shown in FIG. 3A, the AGCU 302 may include two address generation units 304, 305 and a coalescing unit CU 422 which are described in more detail in the related U.S. Nonprovisional patent application Ser. No. 16/239,252, filed Jan. 3, 2019, entitled "VIRTUALIZATION OF A RECONFIGURABLE DATA PROCESSOR," which is incorporated by reference herein. Note that the second AG 305 is omitted from FIG. 3C for clarity. Note also, that while the AGCU 302 includes a data path between the array of configurable units 300 and the TLN 250, it is also omitted for clarity. More details about interconnections of various units and blocks included in the AGCU 302 are described in a related application 63/349,733 which was incorporated by reference above.

The AGCU 302 is coupled to act as an interface between the array of configurable units 300 and the TLN 250. The AG 304 may include, among other things, virtual address generators (VAG0 to VAG15) 307. More specifically, the VAGs are operatively coupled to translate an address 381 received from a configurable unit in the tile 201 to a TLN destination address to allow the configurable unit to communicate with the communication resources on the TLN (i.e. TLN agents). An individual VAG is associated by the compiler with a configurable unit in the tile 201 for communication over the TLN 250. So, for example, an address 381 which is a base address of an external device access request may be received from a configurable unit (e.g. a PMU). The external device access may be to the host 101, external memory coupled to the RDU, or a peer-to-peer (P2P) access to a resource in another RDU. Many such base addresses can be queued into the AG address FIFO 306. The VAG associated with the configurable unit receives the base address (BA) 382 from the FIFO 306 and generates a virtual address (VA) 383 for the external device access based on data in its internal registers. In order to generate the virtual address of the request 383 from the base address 381, the VAGs 307 may use internal logic (not shown) such as chain counters and a data path pipeline. The VA 383 may include one or more of a virtual or physical target RDU ID, a virtual or physical target VAG/AGCU ID, or a more traditional virtual address field, depending on the type of transaction.

The virtual addresses 383 of the request generated by the VAGs 307 have to be mapped to a physical addresses before they can be sent to any TLN destination to further connect to an external device. The runtime software (not shown) maps the compiler generated addresses to available physical memory through the process of VA-PA translation. This is needed to allow runtime to partition a large virtual address space into multiple physical address spaces which could be spread across multiple tiles. In one embodiment, the physical address space can be partitioned into segments where the minimum size of a segment is 1 MB, and the maximum size of a segment is 4 TB.

The virtual addresses VAs 383 are provided to the CU arbiter & mux 331, which selects a single virtual address via arbitration. The selected virtual address (SVA) 384 may be provided to the segment lookaside buffer (SLB) 332. The SLB 332 is operatively coupled to translate the virtual address SVA 384 to a physical address (PA) 385 to be provided to the compare & lookup logic unit 336. The PA 385 may include one or more of a physical RDU ID translated from a virtual RDU ID in the SVA 384, a physical VAG/AGCU ID translated from a virtual VAG/AGCU ID, a TLN Agent ID to identify an agent (e.g. a P-Shim or D-Shim) on the TLN 250 to receive the TLN transaction, and/or a physical address field translated from the virtual address field. In some implementations for some types of transactions, the SVA 384 may bypass the SLB and be provided to the compare & lookup logic unit 336 directly.

As explained above and in more detail in the related U.S. Provisional Application No. 63/349,733, a base address to virtual address to physical address translation is used to convert the base address 381 assigned by the compiler for use by the configurable unit in the tile 201 to an address that is usable by the hardware of the system. This base address BA 381 may be mapped to a physical address (PA) in an external device (memory or I/O) (e.g., actual address of a memory location), by a memory allocator. However, the memory allocator (such as a memory controller to which the external device is connected) may be connected to a TLN agents such as a P-Shim 257, 258 or a D-Shim 259 as shown in FIG. 2. Therefore, in order to access that particular memory allocator, the TLN destination address may also need to be generated using the base address. A TLN destination address (DA) 386 may include an identifier of an agent on the TLN 250 (e.g. a P-Shim or D-Shim), which may consist of a tuple identifying the location of the agent in the two-dimensional mesh of the TLN 250 in addition to an address field for use within the agent. The DA 386 may be generated by the TLN destination address generating logic 330 which may include an identification register (ID reg.) 335 which is used to store an ID for the RDU of the AGCU 302, and a compare and lookup logic unit 336.

First, the compare logic and lookup logic unit 336 is configured to compare the PA 385 (partially or wholly) with the value of the ID register ID reg 335 to find out a request type and further generate a TLN destination address (DA) 386 and APA 387. The compare logic and lookup logic unit 336 may provide both an adjusted physical address APA 387 and DA 386 to the TLN request output stage 339. In some instances, the APA 387 is identical to the PA 385, but in other cases, the PA 385 may be adjusted by the compare and lookup logic 336 to generate the APA 387. The ID reg 335 may also be programmed through the control/status registers (CSRs) 333. Although shown separately, the ID reg 335 and the SLB 332 may also be included in the CSRs 333. In the example shown, a plurality of bits of the physical address PA 385, which may represent a physical RDU/Host ID, are compared against the ID reg 335.

Based on the comparison, the external device access requests can be classified into three types as follows: if the plurality of bits of the PA 385 match the ID register 335, then the request is determined to be a local request. For a local request, a DA 386 will be generated from the PA (or SVA if directly provided to the compare and lookup logic 336) to target an agent (e.g. a D-Shim) on the local TLN 250. If the plurality of the bits of PA 385 match a specific predefined value, then the requests are identified as a Host Request and a P-Shim ID preprogrammed into the CRSs 333 will be used as the DA 386 for communication with the host 101 over the TLN 250. If the plurality of the bits of the PA 385 do not match the ID register, and do not match the specific predefined value, then it is determined to be a remote request. The DA 386 for a remote request may be provided directly from the SLB 332 or may be determined within the compare and lookup logic unit 336 based on the physical RDU ID by accessing a lookup table (or CSRs 333) associating remote RDU IDs or local VAG/AGCUs with a local P-Shim (e.g. P-Shims 257-258).

In some implementations, the control and status registers (CSRs) 333 may provide additional information that is used to generate the DA 386. For example, for a local access, the specific D-Shim ID needed for the DA 386 may depend on additional address bits, depending on the specific memory configurations populated for the D-Shims on the particular RDU. The CSRs 333 can hold information regarding the number of memory channels connected to each TLN agent. The CSRs 333 may also include information about mapping of various memory channels, and mapping of various PCI-shims to the VAGs (VAG0-VAG15) 307. The CSRs 333 are programmed through a bit file as part of program load, or by runtime. In some embodiments, the compare and lookup logic unit 336 can access the CSRs 333 to read any other registers needed for generating the destination address DA 386 from the physical address PA 385. The CSRs 333 can also include a D-shim channel map register, a P-shim steering register, and a host P-shim ID register. All of these registers may be used to further steer the memory or PCI requests to particular TLN agents. If the CU 303 decodes the request as local or remote, it can provide that information to the AG 304 as well.

The DA 386 and the APA 387 may be provided from the TLN destination address generation logic 330 to the TLN request output stage 339. The TLN request output stage 339 acts as an interface to the TLN 250 from the AGCU 302. The TLN 250 uses a mesh of switches to route a transaction between agents. In some cases, the DA 386 may be translated by the TLN request output stage from a basic ID of the agent to a tuple identifying the location within the 2D TLN mesh. The tuple is used to route the transaction through the mesh of switches the target agent. Once the TLN transaction has been routed to the target agent, the APA 387 is used by the target agent to determine what to do. In the case of a target agent being a D-Shim, the APA 387 may be used to determine a memory location with the attached external memory to access. In the case of a remote access, the target P-Shim may take several different actions, depending on the transaction type as is explained below.

As will be explained with respect to FIGS. 4A to 4E, in various peer-to-peer (P2P) transactions, an initiating RDU, which may be referred to as a producer, source, or requester RDU depending on the type of transaction, may initiate various types of transactions to various resources in a remote RDU (which may be referred to as a consumer or target RDU) and in some cases may receive various responses from the consumer RDU. In general, a P2P transaction is initiated by a configurable unit in a tile of the initiating RDU which sends a request for the transaction to a VAG/AGCU that has been linked to the configurable unit for a graph by the compiler and/or runtime software by loading a configuration bit file into the RDU. The VAG/AGCU generates a TLN transaction to a P-Shim on the initiating RDU by generating a TLN DA as described above to identify the P-Shim in the initiating RDU to use for the TLN transaction. The TLN transaction payload may include a header one or more of a transaction identifier, a target RDU ID, a target VAG ID, a physical address, data, and/or other metadata, such as the amount of data to be included in the transaction. The P-Shim in the initiating RDU may use the target RDU ID to generate an address for the target RDU ID on an external communications network using a lookup table. The external communications network address may also include an ID of the initiating RDU, initiating P-Shim, and/or initiating VAG/AGCU so that the target RDU can send a response, if required, to back to the initiating VAG/AGCU. The initiating P-Shim than communicates through a communications interface to the external communications network to a communications interface on a remote RDU. The mechanism used by the external communications network to route the transaction to the remote RDU is outside of the scope of this disclosure and may differ depending on the communications network used.

The communications interface on the remote RDU receives the transaction from the external communications network and determines to which agent on its own local TLN the transaction should be sent (e.g. a VAG/AGCU or D-Shim on the remote RDU). A TLN transaction on the remote RDU is then initiated using the information received in the external communications network transaction to continue the P2P transaction. Once the TLN agent on the remote RDU receives the TLN transaction, it may take appropriate action (e.g. read or write data at the designated location) and may respond back to the initiating VAG/AGCU in some cases (e.g. with read data) to complete the full P2P transaction.

The P2P protocol defines a payload that can be sent as a packet of a different protocol than that used internally to the RDU that allows routing to another device, such as a PCIe Top Level Protocol (TLP) packet, although other protocols could be used for the P2P protocol, such as, but not limited to, Ethernet or InfiniBand. A source RDU can create the payload for the P2P primitive operation. The P2P protocol payload may include one or more of a primitive operation identifier, an ID for the source RDU, an ID for the source VAG/ACGU, an ID of the target RDU, an ID of a target VAG/ACGU, a size of the data transfer, an address for the data in remote memory, and/or the data being transferred, depending on which primitive operation is being used. Various units within both the source RDU and the destination RDU are configured using configuration bit files to perform the various tasks of the P2P operations.

Using a particular implementation as an example, the P-Shim in the initiating RDU accesses a lookup table using the ID of the target RDU to determine a PCIe address that is within the address space defined for the target RDU by its PCIe Base Address Registers (BARs). In at least one implementation, the PCIe address may also include the source RDU ID and the source P-Shim ID. If another protocol is used in place of PCIe, an appropriate identifier for the RDU can be selected using the lookup table, such as an IP address if TCP/IP over Ethernet is used. The initiating P-Shim then creates a P2P header with information about the P2P transaction. The P2P header may include one or more of a target address (e.g. a physical address in a external DRAM connected to the remote RDU), a length of a payload to follow the header, an ID of a VAG/AGCU within the remote RDU, the ID of the initiating VAG/AGCU in the initiating RDU, an ID of the initiating P-Shim, a P2P transaction type, a sequence ID for the P2P transaction, or any other appropriate metadata related to the P2P transaction. In the example implementation, the P2P header is 32 bytes long.

The initiating RDU then creates a PCIe TLP packet using the PCIe address and sends the PCIe TLP as a PCIe Memory Write operation through a PCIe Interconnect fabric with the P2P header as the data for the PCIe Memory Write operation which routes the PCIe TLP to target RDU. For some P2P operations (e.g. a remote write), data may also be included with the P2P header as the data for the PCIe Memory Write operation. The PCIe Interconnect fabric can be any type of PCIe interconnect, including point-to-point links between RDUs, a host root complex, and/or a PCIe switching fabric. If a different protocol is used in place of PCIe, an appropriate interconnect fabric for that protocol can be used, such as a complex of Ethernet routers and switches if Ethernet is used.

The target RDU compares the PCIe address with its own Base Address Registers to determine whether the transaction is within its assigned memory space and if it is, examines the P2P header to determine which P2P primitive operation is being used and to extract the information needed to complete the primitive operation on the target RDU. The target RDU then completes the P2P primitive operation. Because the P2P protocol encapsulates all of the needed information as standard PCIe Memory Write operations, they can flow through any type of PCIe fabric to other RDUs on that interconnect fabric and/or can be re-encapsulated into other protocols, such as Ethernet or InfiniBand, and routed to the other RDU anywhere, including on another board, another system, another rack, or even in another location.

Depending on the type of P2P transaction, the SVA 384 may be translated by the SLB 332 to convert the virtual address, along with the virtual target RDU ID and the target VAG/AGCU ID, to a physical address and IDs. In some P2P transactions, where only the target RDU ID and the target VAG/AGCU ID are needed (i.e. there is no virtual address per se, just virtual device IDs), the SVA 384 may be sent directly to the compare and lookup logic 336 may include its own translation tables to convert the virtual target RDU ID in the SVA 384 to a physical RDU ID which can be used in the compare logic 336, and convert the virtual target VAG/AGCU ID in the SVA 384 to a physical VAG/AGCU ID which may be a part of the APA 387, bypassing the SLB 332. Other implementations may use the SLB 332 to translate the SVA 384 even if no true physical address is needed.

Figure 4A:
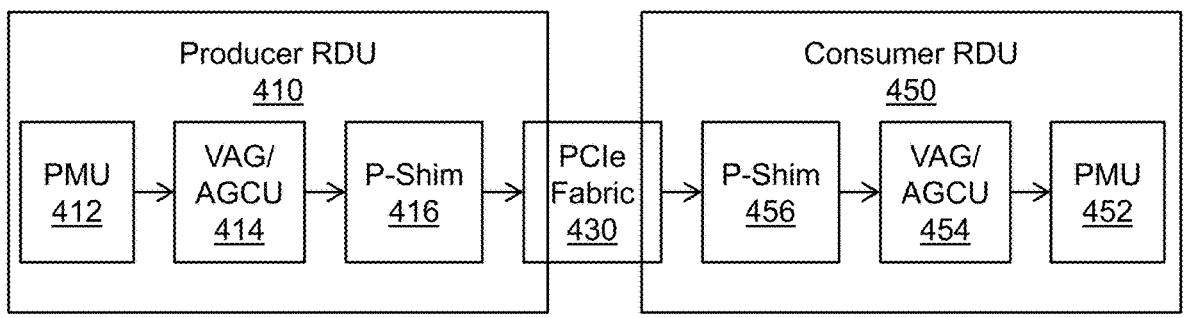
FIG. 4A which shows an example of a streaming write to a PMU using P2P protocol.

FIG. 4A shows an example of a streaming write from a producer RDU 410 to a consumer RDU 450 using the P2P protocol where a producer PMU 412 is configured to perform a store to a consumer PMU 452. The stream write P2P protocol can be useful for a producer/consumer model. It provides a FIFO interface between two PMUs 412, 452 in two different RDUs 410, 450 where one PMU 412 is a producer, and the other PMU 452 is a consumer. Note that no address for the data is passed from the producer PMU 412 to the consumer PMU 452; it is just a stream of data that the consumer PMU 452 can handle as it arrives depending on how it is configured. This is a complex transaction made up of a Stream Write from a producer RDU 410 and a credit return handshake (see FIG. 4B) in the form of a Stream CTS (SCTS) from the consumer RDU 450.

To configure the producer RDU 410 and the consumer RDU 450 for a complex stream write transaction, the producer PMU 412 (in the producer RDU 410) is configured to send data to a VAG 414 in a local AGCU of its tile. The producer VAG 414 is configured with length, source PMU ID, virtual target RDU ID, virtual target VAG/AGCU ID, a Producer Flag, and a Disable SLB translation flag indicating that the P-Shim ID is to be obtained from a P-Shim steering register that contains a field per VAG and is configured by software at the start of a graph. The control bus of the array-level network in the tile of the source PMU 412 is configured to have the VAG 414 send a token to the source PMU 412 in response to a SCTS. The target VAG 454 (in the consumer RDU 450) is configured with target PMU ID, source RDU ID, source VAG/AGCU ID, and Consumer Flag. A P-Shim ID for the consumer VAG 454 is obtained from a P-Shim steering register in the consumer RDU 450. The control bus in the array-level network of the tile of the target PMU 452 is configured for the target PMU 452 to return a token to the VAG 454 when it consumes data.

For a stream write P2P primitive, the target PMU 412 drives stored data to the source VAG 414 within an AGCU of its tile, which acts as the producer agent. The source VAG 414 has been configured to associate data packet size, a virtual RDU ID, and virtual VAG/AGCU ID for the target VAG 454 within the target RDU 450 for data sent from the producer PMU 412. The source VAG 414 translates the virtual target RDU ID and virtual target VAG/AGCU ID to a physical source RDU ID and physical target VAG/AGCU ID in the compare and lookup logic of the CU (or the SLB, depending on the implementation). The P-Shim ID is retrieved for the source VAG 414 from the P-Shim Steering register to use for the destination address (DA) on the TLN of the producer RDU 410. The physical target RDU ID and physical target VAG/AGCU ID are used as to generate adjusted physical address (APA) for the TLN. The source VAG 424 then sends packets of the data to the source P-Shim 416 over the TLN on the producer RDU 410 using the DA/APA. Once the TLN transaction reaches the P-Shim 416, it uses the target RDU ID in the PA to look up the address for the consumer RDU 450 in a Base Address Register (BAR) table. Using that information, the P-Shim 416 generates a PCIe address and encapsulates the data from the source PMU 412, along with the destination VAG/AGCU information and other information as described earlier, into a P2P header which is then made a part of a TLP packet on PCIe that includes the data and then transmit the TLP packet over a PCIe link, and optionally through a PCIe interconnect fabric 430, to the consumer RDU 450. The PCIe network 430 will route the TLP packet to the appropriate RDU based on the address which was provided for that packet.

The TLP packet is received by the target P-Shim 456 which will use the P2P header information to determine what kind of packet it is. In the example shown in FIG. 4A, it will determine that this is a stream write packet, and it will send that packet to the target VAG 454 identified in the packet. The target VAG 454 is pre-programmed to know that stream write packets arriving at that destination VAG are to be sent to a specific target PMU 452 on that RDU 450. The VAG, 454, as it receives packets over the TLN from the P-Shim 456, will send the data to the target PMU 452 to complete the transfer from the source PMU 412 to the target PMU 452.

A stream write transfers data from a producer configurable unit 412 on one RDU 410 to a consumer configurable unit 452 on a different RDU 450. The source PMU 412 may keep track of the amount of space in the target PMU 452 so the target PMU 452 transfer credits or tokens back to the source PMU 412 to indicate when it has consumed a buffer to allow the source PMU 412 to keep track of how much space is currently available in the target PMU 452. When the target PMU 452 empties out a buffer, it informs the source PMU 412 that it has consumed the buffer using a stream clear-to-send (SCTS) P2P primitive transaction to inform the source PMU 412 that it can now send more data to the target PMU 452 without overflowing its buffers.

As explained earlier, in the above-mentioned stream write transaction, virtual to physical address translation is not required as there is no physical address sent with this transaction. In fact, the PCIe address only includes the base register address for the target P-Shim 456 and the ID of the Producer RDU 410 and P-Shim 416. The producer VAG 414 does, however, need to translate virtual target RDU ID and virtual target VAG/AGCU to physical IDs, which can be done either in the SLB or in a different table in the compare and lookup logic of the CU.

Figure 4B:
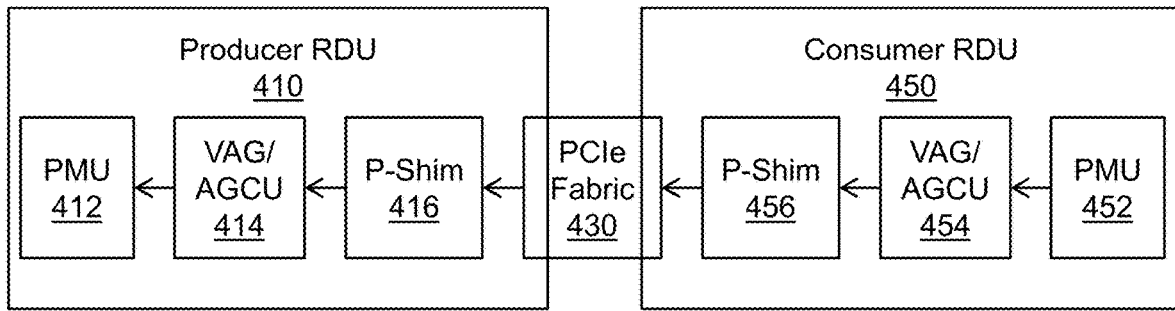
FIG. 4B shows a block diagram of a stream clear to send (SCTS) transfer using P2P protocol.

FIG. 4B shows a block diagram of a primitive SCTS P2P transfer. In the SCTS mechanism, the target PMU 452 (on the right side of FIG. 4B) determines that it should send a token back to the source PMU 412 (on the left side of FIG. 4B), indicating that it has consumed a buffer from the stream. The target PMU 452 sends a signal to what was the target VAG/AGCU 454 over the control network of the array-level network of its tile. That VAG 454 generates a TLN packet to represent that information and sends it over the TLN to the P-Shim 456 on the consumer RDU 450. The ID of the target P-Shim 456, the virtual source AGCU 414 and the virtual source RDU 410 are pre-configured in the target VAG 454 associated with the target PMU 452 and are translated into an ID of the physical source AGCU 414 and an ID of the physical source RDU 410 by the target VAG 454 using the SLB or other tables in the compare and lookup logic of the CU. The ID of the physical source AGCU 414 and the ID of the physical source RDU 410 are incorporated into the TLN address a SCTS transaction sent to the target P-Shim 456. The target P-Shim 456 generates an P2P header for the SCTS transaction and sends that encapsulated as a PCIe TLP to the producer RDU 410. The encapsulated SCTS packet is routed through the PCI fabric 430 in the opposite direction to the producer RDU 410. The source P-Shim 416 in the producer RDU 410 receives the packet, extracts the information from the P2P header indicating that it is a SCTS and identifying the source VAG/AGCU 414, and sends the SCTS packet over the TLN network to the source VAG/AGCU 414. The VAG/AGCU 414, upon receiving the SCTS packet from P-Shim 416, sends a signal over the control bus of the array-level network to the source PMU 412, indicating that a buffer has been consumed by the target PMU 452. This allows the source PMU 412 to keep track of the data being consumed by the target PMU 452 and therefore, how much space is available in the target PMU's 452 buffer.

The stream write, along the SCTS, provides an end-to-end mechanism for transferring data from a source PMU 412 on one RDU 410 to a destination PMU 452 on a different RDU 450 without any host involvement once the two RDUs 410, 450 have been configured to execute a graph with nodes on both RDUs 410, 450. Note that the PCIe address is just used within the PCIe fabric to route the packet to the correct RDU. The PCIe address is then discarded at the destination with the real address information embedded in the packet. This allows a much larger address space to be addressed than could be within the physical address space of a host system due to system limitations which don't allow the full 64-bit address space to be used. Each RDU 410, 450 consumes a relatively small amount of PCIe address space to act as a receiving window. Once a packet is received at an RDU 410, 450, the PCIe address is stripped away along with all the PCIe TLP information and the P2P header is examined to determine the transaction type. The transaction type can be a Remote Read Request, Remote Write Request, Remote Read Completion, Stream Write, Stream CTS, or Rsync Barrier. The payload may also provide the destination information, such as the VAG/AGCU ID or a DRAM address for external DRAM connected to the RDU.

SCTS can be thought of as a token which can be transferred between RDUs. This token can be used for at least two purposes. One purpose is to exchange transfer credits between RDUs as described above. As an illustrative example (referring to FIG. 1), The P2P stream write protocol shown in FIG. 4A may be used to transfer data from a PMU on RDU-A 111, through link 131, the interconnect fabric 120, and link 134, to a PMU on RDU-D 114. Software configures the PMUs as buffers and allocates a number of credits to the RDU-A 111 (the source RDU) indicating the size of the buffer in RDU-D 114 (the destination RDU). RDU-A 111 then starts streaming data to RDU-D 114, decrementing its credit counter as it sends the data, until the credit counter goes to zero, indicating that the buffer RDU-D 114 is full. As RDU-D 114 consumes the data, it frees up space in the buffer. To indicate the fact that the destination buffer has room for more data, RDU-D 114 uses the SCTS mechanism to tell RDU-A 111 that it can send more data. So RDU-A 111 increments its credit counter and since the counter is no longer zero, it is able to send more data. The amount of space in the destination buffer represented by one credit may vary between implementations, but in at least one implementation, a credit may indicate that space for one chunk of data (i.e. one transfer on the vector bus of the array-level network) is available. Some embodiments may enable one SCTS to indicate a number of credits, such as 1, 2, or more, to the source to use in incrementing its credit counter, which can reduce the traffic on the links 131, 134.

Another use case for SCTS is for graph synchronization. When there are multiple RDUs executing a graph, such as graph 143 mapped to RDU-C 113, RDU-E 115, and RDU-F 116 (see FIG. 1), the SCTS mechanism can be used to ensure that all of the RDUs used by that graph have fully loaded their configuration bit files and are ready before execution of the graph is started. It this is not done, a source RDU could send data to a destination RDU before it is ready to receive data. The software can configure an RDU, such as RDU-E 115, that may receive data from another RDU, such as RDU-F 116 to send a SCTS to that RDU to indicate it is ready.

Figure 4C:
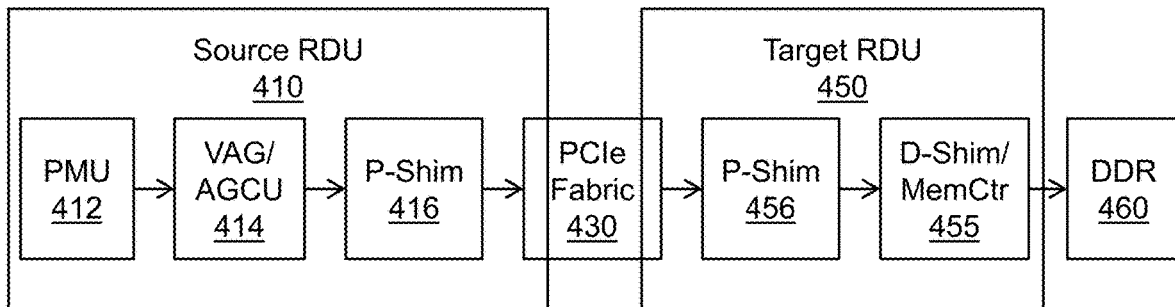
FIG. 4C shows a block diagram of an example remote write operation using P2P protocol.

FIG. 4C shows a block diagram of an example remote write operation using P2P protocol. A remote write allows a source PMU 412 of a source RDU 410 to transfer data to external memory 460 controlled by a target RDU 450. Either a remote store or a remote scatter write may be represented by FIG. 4C. For a remote write scatter, one or more PMUs are configured to store data to addresses from a scatter list stored in their respective scratchpad memories. Addresses are configured as double width (in the PMU and VAG) requiring two scalar packets be sent on the scalar bus of the array-level network if the range of the addresses in the scatter list is >4 GB. For a remote store, a VAG or one or more PMUs are configured to generate linear addresses. These complex transactions (remote store and remote scatter write) consist of a single remote write P2P protocol message as represented in FIG. 4C.

In a remote write operation, a producer PMU 412 sends a write request at an address to the requester VAG 414. The same encapsulation happens as has been described above for the stream write and the SCTS, passing from the source PMU 412 to the source VAG/AGCU 414 and on to the source P-Shim 416. But for a remote write operation, the source VAG 414 generates, in the address package, the virtual target RDU ID and a virtual DRAM address, not a destination VAG/AGCU, because the data does not pass through a VAG/AGCU on its way to the DDR memory 460. The AGCU 414 uses the SLB to translate the virtual target RDU ID to a physical target RDU ID and translate the virtual DRAM address to a physical DRAM address. The SLB also provides the ID of the source P-Shim 416. The source AGCU 414 then performs a TLN write transaction using the ID of the source P-Shim 416 as the destination address (DA) and a combination of the physical target RDU ID and the physical DRAM address as the adjusted physical address (APA).

The source P-Shim 416 receives the TLN write and uses the physical target RDU ID to lookup a base PCIe address for the target RDU 450 and generates the PCIe address using the base PCIe address as well as the ID of the source RDU 410 and source P-Shim 416. It then generates a P2P header as described above which indicates that the P2P transaction is a remote write and includes the physical DRAM address. The source RDU 410 then sends the P2P header and the data over the PCIe fabric 430 using the PCIe address to the target P-Shim 456 of the target RDU 450 as a PCIe memory write operation. The target P-Shim 456 uses the PCIe address to perform assembly of request fragments from different combinations of source RDUs and source P-Shims which allows multiple concurrent P2P remote writes to the same target RDU from different source RDUs. Once the data for a write request has been completely received, the target P-Shim 456 uses the physical address to identify the target D-Shim ID which it uses as the DA for the TLN transaction. It then uses the DA and the DRAM physical address to send the data over the TLN to the target D-Shim 455. The D-Shim 455 provides the address and data to a memory controller which then writes the data to the proper address in the external memory 460.

As explained earlier, in the above mentioned remote write transaction, virtual to physical address translation is required. Initially, a virtual address (VA 384) is translated to a physical address (PA 385 as shown in FIG. 3C). The physical address includes the ID of the target RDU 450 and the physical address within the target RDU 450 for the remote write transaction as well as the identifier of the producer P-Shim 416. The compare and lookup logic uses the ID of the target RDU 450 to compare to the ID of the source RDU 410 (stored in the ID register 335) to determine that this write is to DRAM attached to a remote RDU, not to DRAM attached to the same RDU as the source PMU 412. If the IDs are different, then a P2P remote write is generated. In another implementation, the compare and lookup logic may generate the identifier of the producer P-Shim 416 instead of receiving it from the SLB.

Figure 4D:
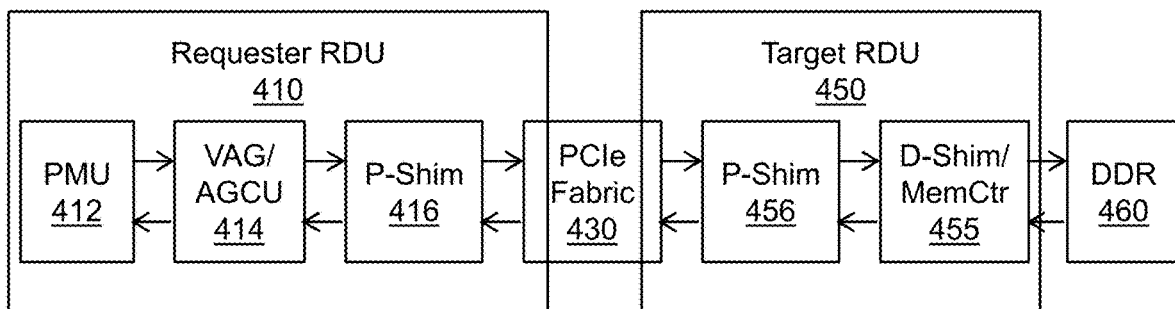
FIG. 4D shows a block diagrams of an example remote read request and read completion operation using P2P protocol.

FIG. 4D shows a block diagram of an example remote read request and read completion operation using P2P protocol, which together constitute a complex remote read operation. The remote read allows a PMU 412 in a requester RDU 410 to retrieve data from the external memory 460 of a target RDU 450. For a gather operation, one or more PMUs are configured to perform loads from addresses in a gather list stored in the scratchpad memories of the respective RDUs. Addresses are configured as double width (in the PMU and VAG) requiring two scalar packets on the scalar bus of the array-level network if the range of the addresses in the gather list is >4 GB. For a regular load (remote read), a VAG or a PMU is configured to generate linear addresses. These complex transactions are split into two independent P2P protocol messages, a Remote Read from the requester PMU 412 to the target D-Shim 455, and a Read Completion from the target D-Shim to the requester PMU 412.

In a remote read request operation, a requester PMU 412 sends a read request for an address to the requester VAG 414 and the DA/APA for the TLN are generated in the same way as they are for the remote write. the requester VAG 414 generates, in the address package, the virtual target RDU ID and a virtual DRAM address. These are then sent through the SLB to generate a physical target RDU ID, a physical DRAM address, and an ID for a requester P-Shim 416 in the requester RDU 410 to which the read request will be sent over the TLN by the requester AGCU 414. The read request TLN transaction can use the ID of the requester P-Shim 416 as the DA and a combination of the physical target RDU ID and the physical DRAM address as the APA.

The requester P-Shim 416 receives the TLN read request and uses the physical target RDU ID to lookup a base PCIe address for the target RDU 450 and generates the PCIe address using the base PCIe address as well as the ID of the source RDU 410 and source P-Shim 416. It then generates a P2P header as described above which indicates that the P2P transaction is a remote read request and includes the physical DRAM address. The requester RDU 410 then sends the P2P header over the PCIe fabric 430 as a PCIe memory write operation using the PCIe address to the target P-Shim 456 of the target RDU 450.

The target P-Shim 456 saves some of the P2P header information for use in the P2P read completion transaction and uses the P2P header information to initiate one or more read requests over the TLN of the target RDU using the physical DRAM address. It may also use the PCIe address to perform assembly of request fragments from different combinations of source RDUs and source P-Shims which allows multiple concurrent P2P remote reads from the same target RDU by different source RDUs. The target P-Shim 456 may use the physical address to determine the ID of the D-Shim on the TLN to use as the destination address (DA) for the TLN transaction. The D-Shim 455 can use the physical DRAM address to cause the memory controller to read the data at that address from the external memory 460, completing the primitive remote read request operation.

Once the D-Shim 455 has received the data from the memory 460, it sends the data to the target P-Shim 456 over the TLN of the target RDU. The target P-Shim 456 uses the information it saved from the remote read request (the requester RDU ID and VAG/AGCU ID) to generate a remote read completion P2P operation. The target P-Shim 456 combines the data read from the memory 460 with the IDs of the requester RDU 410 and requester VAG/AGCU 414 and encapsulates that in another P2P header using a PCIe address it looked up using the ID of the requester RDU 410. The PCIe TLP is then sent back over the PCIe fabric 430 to the requester RDU 410 and its P-Shim 416 using a second PCIe Memory Write operation. The requester P-Shim 416 uses information from the PCIe address and the P2P header to route the data to the requester VAG 414 over the TLN.

The requester VAG 414 is pre-configured to always send the read data coming back to the requester PMU 412.

So a reconfigurable processing unit (e.g. an RDU) can include a first internal network (e.g. an array-level network) and a second internal network (e.g. a TLN). The first internal network and a second internal network have different protocols. The reconfigurable processing unit also includes an interface to an external network (e.g. a PCIe Interface). The external network has a protocol different than either the first internal network or the second internal network. The reconfigurable processing unit includes a first configurable unit (e.g. a PMU), a second configurable unit (e.g. a VAG/AGCU), and a third configurable unit (e.g. a P-Shim). The first configurable unit is coupled to the first internal network and is configured to send, over the first internal network, a request to access an external memory attached to a target reconfigurable processing unit. The second configurable unit is coupled to both the first internal network and the second internal network and is configured to receive the request on the first internal network, obtain a memory address for the request, determine an identifier for the target reconfigurable processing unit based on the memory address, and send the request, the identifier for the target reconfigurable processing unit, and the memory address over the second internal network. The third configurable unit is coupled to both the second internal network and the interface to the external network, and is configured to receive the request, the identifier for the target reconfigurable processing unit, and the memory address on the second internal network. It then determines a routable address on the external network for the target reconfigurable processing unit based on the identifier of the target reconfigurable unit and synthesizes a payload that includes the request, the address, and an identifier of the reconfigurable processing unit, and sends the payload to the routable address on the external network.

One use of remote reads and writes is to handle tensors that are too big to fit in the memory directly connected to an RDU. In that case, the tensor can be partitioned (sharded) to distribute those tensors across all the RDUS in a node or maybe even across nodes. One RDU may want to access those tensor shards, say to read an entry or group of entries from some portion of that table, perform some operation to update them, and then write them back. The P2P protocol between RDUs allows a single RDU to access the full memory across the entire system, not just its locally connected memory. From a programming perspective, it's much easier to just issue the data flow equivalent of a load, which is implemented as a remote read, where it is routed to whatever RDU it needs to go to, accessed the data and sends it back to the requesting RDU. One the data has been updated, it is pushed back to its storage location on the remote RDU.

Figure 4E:
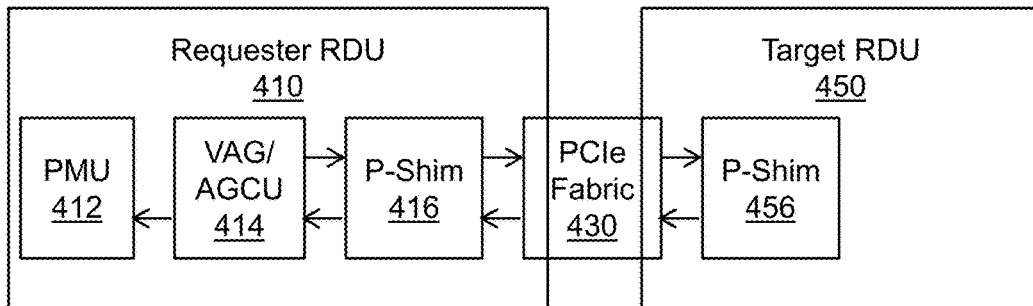
FIG. 4E shows a block diagrams of an example barrier operation using P2P protocol.

FIG. 4E shows a block diagram of an example barrier operation using P2P protocol. The complex barrier operation includes a primitive RSync barrier operation. P2P protocols and scatter operations implemented by RDUs may utilize a barrier synchronization mechanism which can guarantee that all previous write operations have completed, and subsequent read operations will get the most recent write data. A P-Shim includes an RSync CSR that is accessible on its PCIe interface in its memory space as defined by its BAR registers. The RSync Barrier operation is a special primitive that is not encapsulated in a P2P header, but simply uses a PCIe Memory Read and Read Completion of the RSync CSR in PCIe memory space to perform the barrier function.

The requester VAG 414 of the requester RDU 410 can initiate a RSync Barrier operation and send the request over the TLN to the requester P-Shim 416 along with the ID or the target RDU 450. The P-Shim 416 recognizes the RSync barrier request and looks up the routable address of the RSync CSR of the target RDU 450 based on the ID or the target RDU 450. The requester P-Shim 416 then initiates a PCIe Memory Read operation to the routable address and sends it through the PCIe fabric 430 to the target P-Shim 45 of the Target RDU 450.

The P-shim 456 ensures that any previous write transactions have been sent to their destination D-SHIMS and then sends the contents of the RSync CSR as the read data over the PCIe fabric 430 as a PCIe Read Completion to the requester P-Shim 416. The requester P-Shim 416 then returns the data to the requester VAG 414 to indicate that the barrier operation has completed and all previous writes have been completed. In some cases, the VAG 414 may send a token over the array-level network to a PMU 412.

Figure 5:
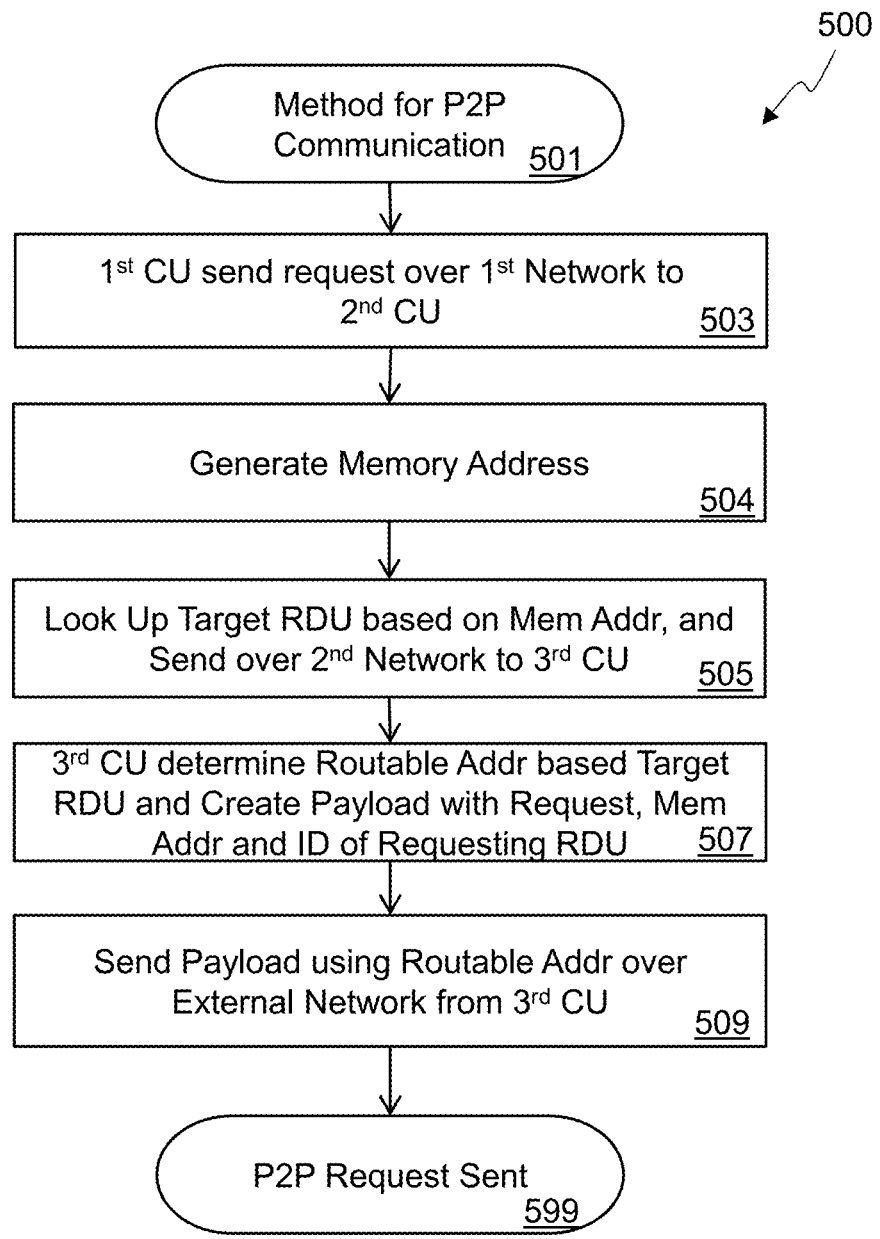
FIG. 5 shows a flowchart of an example method for peer-to-peer communication between configurable units of two different reconfigurable dataflow units.

FIG. 5 shows a flowchart 500 of an example method for peer-to-peer communication 501 between configurable units of two different reconfigurable dataflow units. The method includes sending 503, from a first configurable unit of a first reconfigurable dataflow unit (RDU) over first internal network to a second configurable unit of the first RDU a request to access an external memory attached to a second RDU coupled to the first RDU by an external network. A memory address for the request is generated 504. It may be generated by the first configurable unit by accessing a set of addresses stored in memory or the first configurable unit or by calculating the address based on a previous address in either the first configurable unit or the second configurable unit.

The method continues with looking up, by the second configurable unit, an identifier of the second RDU based on the memory address and sending 505 the request, the identifier for the target reconfigurable processing unit, and the memory address from the second configurable unit over a second internal network to a third configurable unit of the first RDU. The third configurable unit looks up 507 a routable address on the external network for the second RDU based on the identifier of second RDU and synthesizes a payload that includes the request, the address, and an identifier of the first RDU. The payload is then sent 509 from the third configurable unit to the routable address on the external network to complete sending the P2P request 599. The first internal network, a second internal network, and the external network each have a different protocol.

In some implementations, identifiers of the target (or consumer) RDU 450 and target (or consumer) VAG/AGCU 454 programmed into the source VAG 414 may be virtual IDs that are assigned by the compiler and may not match actual physical IDs set for a particular system configuration. The source VAG 414 may include a translation table that can be programmed at configuration of the system that uses the virtual ID for the target RDU 450 to look up a physical RDU ID that can be sent to the P-Shim 416 to use to find a PCIe address that will be claimed by the target RDU 450. A translation table in the source VAG 414 may also be used to translate a virtual target VAG/AGCU ID to the real ID for the target VAG/AGCU 454. In some implementations, a two-step translation process may be used where a virtual address within a virtual machine (VM) is controlling the graph. The VMs provide a translation from a virtual address space to a real address space (i.e. a "physical" address space for the VM), then a hypervisor translates the real address space to a physical address space. So the target RDU and target VAG in the target AGCU may go through this two-step process of translating from a virtual to a real target RDU ID, and then from a real target RDU ID to a physical RDU ID, because physical RDU ID is where the packet needs to be routed over the PCIe.

Additional Features

In some implementations, additional features may be made available beyond those described above. A VAG can be configured to generate SCTS packets on the TLN network in response to following events:
1. Tokens received over the Control section of the array-level network, Counter Done, Program Load/Arg load completion
2. Request Barrier
3. RSYNC Completion
4. Token Barrier
5. P-Barrier If multiple of above events occur before the SCTS packet is sent out on the TLN, then multiple events may be combined into a single SCTS packet.

In some implementations a counter is added to track multiple outbound SCTS requests per VAG. Each SCTS request received by the VAG increments the counter, and every SCTS packet launched on TLN decrements the counter. With this enhancement, there is a guaranteed SCTS packet on TLN for every SCTS request received by a VAG. Also, VAG will release a token on the array-level network when a SCTS packet is launched on the TLN. The source of SCTS requests would use the TLN token as an ACK and ensure that the SCTS counter in VAG does not overflow.

On the RDU receiving an SCTS packet, the AGCU receives SCTS packet from the P-Shim over the TLN request network. In some implementations, an AGCU may have an input request FIFO (which can be of any length, but may be four entries in some implementations), where the SCTS packets get queued. If a tile is not in an EXECUTE state (i.e. the tile has loaded its configuration bit file and has started execution of that bit file), then the SCTS packets stay queued in the FIFO until the tile transitions into EXECUTE state. Once the tile is in the EXECUTE state, the SCTS packet is processed by the destination VAG, and is sent out as a control token over the array-level network to the destination PMU, which is determined by the VAG programming.

If an SCTS packet received by the AGCU when its tile is not in the EXECUTE state, it could potentially cause other subsequent requests received by the AGCU to be blocked. These requests can include CSR reads and writes from the host and other SCTS packets. If more than 4 SCTS packets (in an implementation with a 4-entry input request FIFO) are received, the input request FIFO will fill-up and can cause TLN network congestion and blockage. In order to address this issue, implementations include an input SCTS counter for each VAG in the AGCU. When an SCTS packet is received by AGCU, it is immediately dequeued from request input FIFO and the corresponding counter in the destination VAG is incremented. The counter can be sized to accommodate the maximum number of SCTS packets which a particular VAG can receive. Then when the tile goes into EXECUTE mode, the VAG sends the SCTS packet out to PMU in form of a control token on array-level control network, and the counter is decremented. Each VAG is pre-programmed to communicate with a particular PMU and can send out 1 token every cycle.

In some implementations, P2P packets include an ID for the application (i.e. the executable graph) that generated the P2P packet. A new CSR in each VAG may be provided which can be programmed with the ID of for the application. A non-zero value of this register indicates that P2P ID check functionality is enabled and triggers the following:

Every P2P transaction (SCTS and SWRITE) will send the ID of the application in the request packet to the requester P-Shim which will send it over PCIe to the remote RDU.

When the P2P packet reaches remote RDU, the target P-Shim will extract the ID of the application from the PCIE packet and send it in the Sequence ID bits to the destination AGCU.

When AGCU receives the P2P packet, it will compare the ID of the application sent in the Sequence ID with the ID of the application set in CSR of the destination VAG. If the bits match, then the packet is sent to its destination. If the bits do not compare, then the AGCU can perform one or more of the following:

AGCU will drop the packet and not send it to its destination.
AGCU will log an error.
AGCU will interrupt the host.

If P2P ID check functionality is not enabled then P2P packets are transmitted without the ID of the application in the Sequence ID field, and the received P2P packets are always sent to the destination without being dropped. No P2P Errors are reported.

The inclusion of the ID of the application can act as a protection mechanism to allow a VAG that receives an SCTS packet (or any other type of P2P packet) to check to ensure that it came from the proper source, and not some mis-programmed (or malicious) graph which could disrupt the proper operation of the graph. The ID of the application allows each peer-to-peer transaction to be validated at the receiving VAG/AGCU to ensure that the SCTS is indeed part of the current executing graph. If it isn't, the packet can be discarded and in some cases, an interrupt may be sent to the host indicating that an unexpected SCTS packet has been received.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "CGRA IC," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA/CGRA IC or other programmable logic as well as traditional binary computer instructions, and the term "processor" explicitly includes logic in an FPGA/CGRA IC or other programmable logic configured by the configuration information in addition to a traditional processing core, such as one in a central processing unit (CPU) or graphics processing unit (GPU). Furthermore, "executed" instructions explicitly includes electronic circuitry of an FPGA/CGRA IC or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. In addition, the computer program code may be written in Verilog, VHDL or another hardware description language to generate configuration instructions for an FPGA/CGRA IC or other programmable logic. The computer program code if converted into an executable form and loaded onto a computer, FPGA/CGRA IC, or other programmable apparatus, produces a computer implemented method. The instructions which execute on the computer, FPGA/CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium is comprised by an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Example of implementations are provided below:

Example 1. A computing system comprising: a plurality of reconfigurable dataflow units (RDUs) including a first RDU and a second RDU, individual RDUs of the plurality of RDUs respectively including: a first set of configurable units, including a first configurable unit, individually coupled to a first internal network, a second set of configurable units, including a second configurable unit, individually coupled to the first internal network and a second internal network, a set of external interfaces including a first external network interface for communication over an external network and a first external memory interface a third set of configurable units individually coupled to the second internal network and an external interface of the set of external interfaces, including a third configurable unit coupled to the first external network interface and a fourth configurable unit coupled to the first external memory interface; wherein the first internal network, the second internal network, and the external network each have different protocols; and a plurality of interconnects coupled to the external interfaces of the plurality of RDUs, including a first communication path coupling the first external interface of the first RDU to the first external interface of the second RDU; the first configurable unit of the first RDU configured to send a request to access an external memory attached to the second RDU to the second configurable unit of the first RDU over the first internal network of the first RDU; the second configurable unit of the first RDU configured to obtain a memory address for the request, determine an identifier for the second RDU based on the memory address, and send the request, the identifier for the target reconfigurable processing unit, and the memory address to the third configurable unit of the first RDU over the second internal network of the first RDU; the third configurable unit of the first RDU configured to generate a routable address on the external network based on the identifier of for the second RDU, synthesize a payload that includes the request and the address, and send the payload to the routable address through the first external network interface of the first RDU and through the first communication path; the third configurable unit of the second RDU configured to receive the payload from the first external network interface of the second RDU, and send the request and the address from the payload to the fourth configurable unit of the second RDU over the second internal network of the second RDU; and the fourth configurable unit of the second RDU configured to use the address to access the external memory through the first external memory interface of the second RDU to perform the request.

Example 2. The computing system of example 1, the request comprising a write request; the first configurable unit of the first RDU further configured to send data for the request to the second configurable unit of the RDU over the first internal network of the first RDU; the second configurable unit of the first RDU further configured to send the data for the request to the third configurable unit of the first RDU over the second internal network of the first RDU; the third configurable unit of the first RDU further configured to include the data in the payload; the third configurable unit of the second RDU further configured to send the data from the payload to the fourth configurable unit of the second RDU over the second internal network of the second RDU; and the fourth configurable unit of the second RDU further configured to write the data to the address of the external memory through the first external memory interface of the second RDU.

Example 3. The computing system of example 1, the request comprising a read request; the third configurable unit of the first RDU further configured to include an identifier of the second configurable unit of the first RDU and an identifier of the first RDU in the payload; the third configurable unit of the second RDU further configured to temporarily save the identifier of the second configurable unit of the first RDU and the identifier of the first RDU received in the payload; the fourth configurable unit of the second RDU further configured to receive data through the first external memory interface of the second RDU read from the address of the external memory, and send the data to the third configurable unit of the second RDU over the second internal network of the second RDU; the third configurable unit of the second RDU further configured to generate a return address on the external network based on the saved identifier of for the first RDU, synthesize a return payload that includes the data and the saved identifier of the second configurable unit of the first RDU, and send the return payload to the return address through the first external network interface of the second RDU and through the first communication path; the third configurable unit of the first RDU further configured to send the data from the return payload to the second configurable unit of the first RDU over the second internal network of the first RDU; and the second configurable unit of the first RDU further configured to send the data to the first configurable unit of the first RDU over the first internal network of the first RDU.

Example 4. The computing system of example 1, the first configurable unit of the first RDU further configured to generate the address send the address to the second configurable unit of the first RDU over the first internal network of the first RDU.

Example 5. The computing system of example 4, the first configurable unit of the first RDU further configured to generate the address by accessing a table of addresses stored in a memory of the first configurable unit of the first RDU.

Example 6. The computing system of example 4, the first configurable unit of the first RDU further configured to generate the address by calculating the address based on a previous address.

Example 7. The computing system of example 1, the second configurable unit further configured to generate the address.

Example 8. The computing system of example 7, the second configurable unit further configured to generate the address by calculating the address based on a previous address.

Example 9. A reconfigurable processing unit comprising: a first internal network and a second internal network, the first internal network and the second internal network having different protocols; an interface to an external network, the external network having a protocol different than either the first internal network or the second internal network; a first configurable unit coupled to the first internal network and configured to send, over the first internal network, a request to access an external memory attached to a target reconfigurable processing unit; a second configurable unit coupled to both the first internal network and the second internal network and configured to receive the request on the first internal network, obtain a memory address for the request, determine an identifier for the target reconfigurable processing unit based on the memory address, and send the request, the identifier for the target reconfigurable processing unit, and the memory address over the second internal network; and a third configurable unit coupled to both the second internal network and the interface to the external network, and configured to receive the request, the identifier for the target reconfigurable processing unit, and the memory address on the second internal network, determine a routable address on the external network for the target reconfigurable processing unit based on the identifier of the target reconfigurable unit, synthesize a payload that includes the request, the address, and an identifier of the reconfigurable processing unit, and send the payload to the routable address on the external network.

Example 10. The reconfigurable processing unit of example 9, the first configurable unit further configured to generate the address send the address to the second configurable unit over the first internal network.

Example 11. The reconfigurable processing unit of example 10, the first configurable unit further configured to generate the address by accessing a table of addresses stored in a memory of the first configurable unit.

Example 12. The reconfigurable processing unit of example 10, the first configurable unit further configured to generate the address by calculating the address based on a previous address.

Example 13. The reconfigurable processing unit of example 9, the second configurable unit further configured to generate the address.

Example 14. The reconfigurable processing unit of example 13, the second configurable unit further configured to generate the address by calculating the address based on a previous address.

Example 15. The reconfigurable processing unit of example 9, wherein the request comprises a write; the first configurable unit further configured to send data for the request over the first internal network to the second configurable unit; the second configurable unit further configured to send the data for the request over the second internal network to the third configurable unit; and the third configurable unit further configured to include the data in the payload.

Example 16. The reconfigurable processing unit of example 9, further comprising a fourth configurable unit coupled to the second internal network and to an external memory interface; the third configurable unit further configured to receive a second payload including a second request and a second address from the external network interface, and send the second request and the second address to the fourth configurable unit over the second internal network; and the fourth configurable unit configured to use the second address to access an external memory through the external memory interface to perform the second request.

Example 17. The reconfigurable processing unit of example 16, the request comprising a write request and the second payload including second data; the third configurable unit further configured to send the second data to the fourth configurable unit over the second internal network; and the fourth configurable unit further configured to write the second data to the address of the external memory through the first external memory interface.

Example 18. The reconfigurable processing unit of example 16, the request comprising a read request and the second payload including an identifier of a requesting reconfigurable processing unit and an identifier of a configurable unit of the requesting reconfigurable processing unit; the third configurable unit further configured to temporarily save the identifier of the requesting reconfigurable processing unit and the identifier of the configurable unit of the requesting reconfigurable processing unit; the fourth configurable unit further configured to receive second data through the external memory interface read from the second address of the external memory, and send the second data to the third configurable unit over the second internal network; the third configurable unit further configured to generate a return address on the external network based on the saved identifier of the requesting reconfigurable processing unit, synthesize a return payload that includes the second data and the saved identifier of configurable unit of the requesting reconfigurable processing unit, and send the return payload to the return address through the first external network interface.

Example 19. A method for peer-to-peer communication between configurable units of two reconfigurable processing units (RPUs), the method comprising: sending, from a first configurable unit of a first RPU over first internal network to a second configurable unit of the first RPU a request to access an external memory attached to a second RPU coupled to the first RPU by an external network; generating a memory address for the request; looking up, by the second configurable unit, an identifier of the second RPU based on the memory address; sending the request, the identifier for the target reconfigurable processing unit, and the memory address from the second configurable unit over a second internal network to a third configurable unit of the first RPU; looking up, by the third configurable unit, a routable address on the external network for the second RPU based on the identifier of second RPU; synthesizing, by the third configurable unit, a payload that includes the request, the address, and an identifier of the first RPU; and sending the payload from the third configurable unit to the routable address on the external network; wherein the first internal network, a second internal network, and the external network each have a different protocol.

Example 20. The method of example 19, wherein the first configurable unit generates the address and sends the address to the second configurable unit over the first internal network.

Example 21. The method of example 20, further comprising accessing a table of addresses stored in a memory of the first configurable unit to generate the address.

Example 22. The method of example 20, further comprising calculating the address based on a previous address.

Example 23. The method of example 19, wherein the second configurable unit generates the address.

Example 24. The method of example 23, further comprising calculating the address based on a previous address.

Example 25. The method of example 19, wherein the request comprises a write, the method further comprising: sending data for the request from the first configurable unit to the second configurable unit over the first internal network; sending the data for the request from the second configurable unit to the third configurable unit over the second internal network; and including the data in the payload.

Example 26. The method of example 19, further comprising: receiving a second payload including a second request and a second address over the external network at the third configurable unit; sending the second request and the second address from the third configurable unit to a fourth configurable unit over the second internal network; using, by the fourth configurable unit, the second address to access an external memory to perform the second request.

Example 27. The method of example 26, wherein the second request comprises a write request and the second payload includes second data, the method further comprising: sending the second data from the third configurable unit to the fourth configurable unit over the second internal network; and writing the second data to the address of the external memory.

Example 28. The method of example 26, wherein the second request comprises a read request and the second payload includes an identifier of a requesting RPU and an identifier of a configurable unit of the requesting RPU, the method further comprising: temporarily saving the identifier of the requesting RPU and the identifier of the configurable unit of the requesting RPU at the third configurable unit; receive second data from the second address of the external memory at the fourth configurable unit; sending the second data from the fourth configurable unit to the third configurable unit over the second internal network; generating a return address for the external network at the third configurable unit based on the saved identifier of the requesting RPU; synthesizing a return payload that includes the second data and the saved identifier of configurable unit of the requesting RPU; and sending the return payload to the return address over the external network.

Example 29. A reconfigurable processing unit comprising: a first internal network and a second internal network, the first internal network and the second internal network having different protocols; an interface to an external network, the external network having a protocol different than either the first internal network or the second internal network; a first configurable unit coupled to the first internal network; a second configurable unit coupled to both the first internal network and the second internal network and having a register to store a local application ID; and a third configurable unit coupled to both the second internal network and the interface to the external network, and configured to receive a payload containing a transaction type identifier, an identifier of the second configurable unit, and a source application ID from the external network, and send the transaction type identifier and the source application ID to the second configurable unit over the second internal network; the second configurable unit configured to send information based on the transaction type identifier to the first configurable unit over the first internal network in response to the received source application ID matching the local application ID retrieved from the register, and not sending information related to the payload to the first configurable unit in response to the received source application ID not matching the local application ID.

Example 30. The reconfigurable processing unit of example 29, the second configurable unit further configured to generate an error condition in response to the received source application ID not matching the local application ID.

Example 31. The reconfigurable processing unit of example 29, wherein the transaction type identifier comprises a stream write, the payload contains write data, and the information sent to the first configurable unit includes the write data.

Example 32. The reconfigurable processing unit of example 31, the first configurable unit configured to store the write data in memory of the first configurable unit.

Example 33. The reconfigurable processing unit of example 32, the first configurable unit configured send a token to the second configurable unit over the first internal network in response to consuming the data stored in the memory of the first configurable unit; the second configurable unit further configured to, in response to receiving the token from the first configurable unit, send a packet including an indication of data consumption, the local application ID, an identifier for a target reconfigurable processing unit, and an identifier for a target configurable unit of the target reconfigurable processing unit, to the third reconfigurable unit over the second internal network; the third reconfigurable unit further configured to, in response to receiving the packet from the second configurable unit, determine an address on the external network for the target reconfigurable processing unit based on the identifier of the target reconfigurable processing unit, synthesize a second payload including a transaction type ID that indicates data consumption, the local application ID, and an identifier of the reconfigurable processing unit, and send the second payload to the address on the external network.

Example 34. The reconfigurable processing unit of example 29, wherein the transaction type identifier comprises an indication of data consumption by a sender of the payload, and the information sent to the first configurable unit includes a token sent over the first internal network.

Example 35. The reconfigurable processing unit of example 34, the first configurable unit configured to increment a buffer size counter in response to receiving the token.

Example 36. The reconfigurable processing unit of example 35, the first configurable unit further configured to determine whether the buffer size counter has a value greater than zero, and in response to the buffer size counter having a value greater than zero, decrement the buffer size counter and send data over the first internal network to the second configurable unit; the second configurable unit further configured to, in response to receiving the data from the first configurable unit, send a packet including the data, the local application ID, an identifier for a target reconfigurable processing unit, and an identifier for a target configurable unit of the target reconfigurable processing unit to the third reconfigurable unit over the second internal network; the third reconfigurable unit further configured to, in response to receiving the packet from the second configurable unit, determine an address on the external network for the target reconfigurable processing unit based on the identifier of the target reconfigurable unit, synthesize a payload that includes a stream write request, the data, the local application ID, and an identifier of the reconfigurable processing unit, and send the payload to the address on the external network.

Example 37. A method for peer-to-peer communication between a first reconfigurable processing unit (RPU) and a second RPU, the first RPU having a second configurable unit, a first configurable unit coupled to the second configurable unit by a first internal network, and a third configurable unit coupled to the second configurable unit by a second internal network, the method comprising: storing a local application ID in a register of the second configurable unit; receiving a payload from an external network at the third configurable unit, the payload containing a transaction type identifier, an identifier of the second configurable unit, and a source application ID; sending the transaction type identifier and the source application ID from the third configurable unit to the second configurable unit over the second internal network; send information based on the transaction type identifier to the first configurable unit over the first internal network in response to the received source application ID matching the local application ID, and not sending information related to the payload to the first configurable unit in response to the received source application ID not matching the local application ID.

Example 38. The method of example 37, the method further comprising generating an error condition in response to the received source application ID not matching the local application ID.

Example 39. The method of example 37, wherein the transaction type identifier comprises a stream write, the payload contains write data, and the information sent to the first configurable unit includes the write data.

Example 40. The method of example 39, further comprising storing the write data in memory of the first configurable unit.

Example 41. The method of example 40, further comprising: sending a token from the first configurable unit to the second configurable unit over the first internal network in response to consuming the data stored in the memory of the first configurable unit; sending a packet including an indication of data consumption, the local application ID, an identifier for the second RPU, and an identifier for a target configurable unit of the second RPU, from the second configurable unit to the third reconfigurable unit over the second internal network in response to receiving the token from the first configurable unit at the second configurable unit; looking up an address on the external network for the second RPU based on the identifier of the second RPU, in response to receiving the packet at the third reconfigurable unit from the second configurable unit; synthesizing a second payload including a transaction type ID that indicates data consumption, the local application ID, and an identifier of the first RPU; and sending the second payload to the address on the external network.

Example 42. The method of example 37, wherein the transaction type identifier comprises an indication of data consumption by a sender of the payload, and the information sent to the first configurable unit includes a token sent over the first internal network.

Example 43. The method of example 42, further comprising incrementing a buffer size counter in the first configurable unit in response to receiving the token.

Example 44. The method of example 43, further comprising: determining, by the first configurable unit, whether the buffer size counter has a value greater than zero; decrementing the buffer size counter in the first configurable unit and sending data over the first internal network from the first configurable unit to the second configurable unit in response to the buffer size counter having a value greater than zero; sending a packet including the data, the local application ID, an identifier for the second RPU, and an identifier for a target configurable unit of the second RPU from the second configurable unit to the third reconfigurable unit over the second internal network; looking up an address on the external network for the second RPU based on the identifier of the target RPU at the third configurable unit; and synthesizing a payload including a stream write request, the data, the local application ID, and an identifier of the reconfigurable processing unit, and send the payload to the address on the external network from third reconfigurable unit.

Example 45. A reconfigurable processing unit comprising: a first internal network and a second internal network, the first internal network and the second internal network having different protocols; an interface to an external network, the external network having a protocol different than either the first internal network or the second internal network; a first configurable unit coupled to the first internal network; a second configurable unit coupled to both the first internal network and the second internal network; and a third configurable unit coupled to both the second internal network and the interface to the external network, and configured to receive a payload containing a transaction type identifier and an identifier of the second configurable unit through the interface to the external network, and send a first packet including the transaction type identifier to the second configurable unit over the second internal network; the second configurable unit configured to, in response to the transaction type identifier being a particular type, increment a counter; the second configurable unit configured to determine that the first configurable unit is in an execution state, and in response while the counter is non-zero, send a token over the first internal network to the first configurable unit and decrement the counter.

Example 46. The reconfigurable processing unit of example 45, the first configurable unit configured to increment a buffer size counter in response to receiving the token.

Example 47. The reconfigurable processing unit of example 46, the first configurable unit further configured to determine whether the buffer size counter has a value greater than zero, and in response to the buffer size counter having a value greater than zero, decrement the buffer size counter and send data over the first internal network to the second configurable unit; the second configurable unit further configured to, in response to receiving the data from the first configurable unit, send a second packet including the data, an identifier for a target reconfigurable processing unit, and an identifier for a target configurable unit of the target reconfigurable processing unit to the third reconfigurable unit over the second internal network; the third reconfigurable unit further configured to, in response to receiving the second packet from the second configurable unit, determine an address on the external network for the target reconfigurable processing unit based on the identifier of the target reconfigurable unit, synthesize a second payload that includes a stream write request, the data, and an identifier of the reconfigurable processing unit, and send the second payload to the address over the external network.

Example 48. The reconfigurable processing unit of example 45, the second configurable unit further configured to receive a third packet on the second internal network and queue the packet in a FIFO of the second configurable unit; wherein the first packet is not queued in the FIFO.

Example 49. The reconfigurable processing unit of example 45, the second configurable unit further configured to: (a) receive a request to send a fourth packet including the particular type of transaction type over the second internal network; (b) increment a counter in response to receiving the request; (c) send the fourth packet including the particular type of transaction over the second internal network; (d) decrement the counter in response to sending the fourth packet; (e) checking a value of the counter and in response to the value of the counter being greater than zero, repeating (c), (d), and (e) until the value of the counter is zero.

Example 50. A method for peer-to-peer communication between a first reconfigurable processing unit (RPU) and a second RPU, the first RPU having a second configurable unit, a first configurable unit coupled to the second configurable unit by a first internal network, and a third configurable unit coupled to the second configurable unit by a second internal network, the method comprising: receiving a payload containing a transaction type identifier and an identifier of the second configurable unit over an external network at the third configurable unit; sending a first packet including the transaction type identifier to the second configurable unit over the second internal network; incrementing a counter in the second configurable unit in response to the transaction type identifier being a particular type; determining, by the second configurable unit, that the first configurable unit is in an execution state; and sending a token over the first internal network to the first configurable unit and decrementing the counter in response to said determination while the counter is non-zero.

Example 51. The method of example 50, further comprising incrementing a buffer size counter in the first configurable unit in response to receiving the token.

Example 52. The method of example 51, further comprising: determining that the buffer size counter in the first configurable unit has a value greater than zero; decrementing the buffer size counter; sending data over the first internal network from the first configurable unit to the second configurable unit; sending a second packet including the data, an identifier for the second RPU, and an identifier for a target configurable unit of the second RPU from the second configurable unit to the third reconfigurable unit over the second internal network; looking up an address on the external network for the second RPU at the third configurable unit based on the identifier of the second RPU; synthesizing a second payload that includes a stream write request, the data, and an identifier of the second RPU; and sending the second payload from the third configurable unit to the address over the external network.

Example 53. The method of example 50, further comprising: receiving a third packet on the second internal network at the second configurable unit; and queuing the packet in a FIFO of the second configurable unit; wherein the first packet is not queued in the FIFO.

Example 54. The method of example 50, further comprising: (a) receiving a request to send a fourth packet including the particular type of transaction type over the second internal network at the second configurable unit; (b) incrementing a counter in the second configurable unit in response to receiving the request; (c) sending the fourth packet including the particular type of transaction over the second internal network from the second configurable unit; (d) decrementing the counter in the second configurable unit in response to sending the fourth packet; (e) checking a value of the counter in the second configurable unit, and in response to the value of the counter being greater than zero, repeating (c), (d), and (e) until the value of the counter is zero.

Example 55. A system comprising: a reconfigurable dataflow unit (RDU) that includes: an array of configurable units; one or more input/output (I/O) interfaces for connection to external data processing resources; a network coupled to the array of configurable units and the one or more I/O interfaces; a configurable routing control circuit coupled between the network and the array of configurable units, the configurable routing control circuits including configurable routing tables; a resource configuration controller to allocate resources of the RDU for a graph and to configure the configurable routing tables according to the allocated resources; the routing control circuits configured to executing a peer-to-peer transaction to the external data processing resources over an I/O interface of the one or more I/O interfaces.

Example 56. The system of example 55, wherein the external data processing resources comprise another RDU or a memory device.

Example 57. A reconfigurable processing unit includes a first configurable unit configured to send a request to access an external memory attached to a target reconfigurable processing unit over a first internal network. A second configurable unit is configured to receive the request on the first internal network, obtain a memory address for the request, determine an identifier for the target reconfigurable processing unit based on the memory address, and send the request, the identifier, and the memory address over a second internal network. A third configurable unit is configured to receive the request, the identifier, and the memory address on the second internal network, determine a routable address on an external network for the target reconfigurable processing unit based on the identifier, synthesize a payload that includes the request, the address, and an identifier of the reconfigurable processing unit, and send the payload to the routable address on the external network.

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments but should be defined only in accordance with the following claims and equivalents thereof.

We claim as follows:

1. A reconfigurable processing unit comprising:
a first internal network and a second internal network, the first internal network and the second internal network having different protocols;
an interface to an external network, the external network having a protocol different than either the first internal network or the second internal network;
a first configurable unit coupled to the first internal network;
a second configurable unit coupled to both the first internal network and the second internal network; and
a third configurable unit coupled to both the second internal network and the interface to the external network, and configured to receive a payload containing a transaction type identifier and an identifier of the second configurable unit through the interface to the external network, and send a first packet including the transaction type identifier to the second configurable unit over the second internal network;
the second configurable unit configured to, in response to the transaction type identifier being a particular type, increment a counter; and
the second configurable unit further configured to determine that the first configurable unit is in an execution state, and in response while the counter is non-zero, send a token over the first internal network to the first configurable unit and decrement the counter.

2. The reconfigurable processing unit of claim 1, the first configurable unit configured to increment a buffer size counter in response to receiving the token.

3. The reconfigurable processing unit of claim 2, the first configurable unit further configured to determine whether the buffer size counter has a value greater than zero, and in response to the buffer size counter having a value greater than zero, decrement the buffer size counter and send data over the first internal network to the second configurable unit;
the second configurable unit further configured to, in response to receiving the data from the first configurable unit, send a second packet including the data, an identifier for a target reconfigurable processing unit, and an identifier for a target configurable unit of the target reconfigurable processing unit to the third configurable unit over the second internal network; and
the third configurable unit further configured to, in response to receiving the second packet from the second configurable unit, determine an address on the external network for the target reconfigurable processing unit based on the identifier of the target configurable unit, synthesize a second payload that includes a stream write request, the data, and an identifier of the reconfigurable processing unit, and send the second payload to the address over the external network.

4. The reconfigurable processing unit of claim 1, the second configurable unit further configured to receive a third packet on the second internal network and queue the third packet in a FIFO of the second configurable unit;
wherein the first packet is not queued in the FIFO.

5. The reconfigurable processing unit of claim 1, the second configurable unit further configured to:
(a) receive a request to send a fourth packet including the particular type of transaction type over the second internal network;
(b) increment a counter in response to receiving the request;
(c) send the fourth packet including the particular type of transaction over the second internal network;
(d) decrement the counter in response to sending the fourth packet; and
(e) checking a value of the counter and in response to the value of the counter being greater than zero, repeating (c), (d), and (e) until the value of the counter is zero.

6. A method for peer-to-peer communication between a first reconfigurable processing unit (RPU) and a second RPU, the first RPU having a second configurable unit, a first configurable unit coupled to the second configurable unit by a first internal network, and a third configurable unit coupled to the second configurable unit by a second internal network, the method comprising:
receiving a payload containing a transaction type identifier and an identifier of the second configurable unit over an external network at the third configurable unit;
sending a first packet including the transaction type identifier to the second configurable unit over the second internal network;
incrementing a counter in the second configurable unit in response to the transaction type identifier being a particular type;
determining, by the second configurable unit, that the first configurable unit is in an execution state; and
sending a token over the first internal network to the first configurable unit and decrementing the counter in response to said determination while the counter is non-zero.

7. The method of claim 6, further comprising incrementing a buffer size counter in the first configurable unit in response to receiving the token.

8. The method of claim 7, further comprising:

determining that the buffer size counter in the first configurable unit has a value greater than zero;

decrementing the buffer size counter;

sending data over the first internal network from the first configurable unit to the second configurable unit;

sending a second packet including the data, an identifier for the second RPU, and an identifier for a target configurable unit of the second RPU from the second configurable unit to the third configurable unit over the second internal network;

looking up an address on the external network for the second RPU at the third configurable unit based on the identifier of the second RPU;

synthesizing a second payload that includes a stream write request, the data, and an identifier of the second RPU; and sending the second payload from the third configurable unit to the address over the external network.

9. The method of claim 6, further comprising:

receiving a third packet on the second internal network at the second configurable unit; and queuing the third packet in a FIFO of the second configurable unit;

wherein the first packet is not queued in the FIFO.

10. The method of claim 6, further comprising:

(a) receiving a request to send a fourth packet including the particular type of transaction type over the second internal network at the second configurable unit;

(b) incrementing a counter in the second configurable unit in response to receiving the request;

(c) sending the fourth packet including the particular type of transaction over the second internal network from the second configurable unit;

(d) decrementing the counter in the second configurable unit in response to sending the fourth packet; and (e) checking a value of the counter in the second configurable unit, and in response to the value of the counter being greater than zero, repeating (c), (d), and (e) until the value of the counter is zero.

* * * * *